United States Patent
Monsrud et al.

(10) Patent No.: US 12,024,451 B2
(45) Date of Patent: Jul. 2, 2024

(54) METHODS AND APPARATUS FOR CONTROLLING WATER HARDNESS

(71) Applicant: ECOLAB USA INC., Saint Paul, MN (US)

(72) Inventors: Lee J. Monsrud, Saint Paul, MN (US); Xin Sun, Saint Paul, MN (US); Kristen Mills, Saint Paul, MN (US); Douglas J. Prideaux, Saint Paul, MN (US); Beth E. Benson, Saint Paul, MN (US); Kim R. Solomon, Saint Paul, MN (US); Keith E. Olson, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 223 days.

(21) Appl. No.: 16/948,738

(22) Filed: Sep. 30, 2020

(65) Prior Publication Data

US 2021/0009452 A1    Jan. 14, 2021

Related U.S. Application Data

(60) Continuation of application No. 15/000,919, filed on Jan. 19, 2016, now abandoned, which is a division of
(Continued)

(51) Int. Cl.
*C02F 5/10*  (2023.01)
*C02F 1/42*  (2023.01)
(Continued)

(52) U.S. Cl.
CPC .................. *C02F 5/10* (2013.01); *C02F 1/42* (2013.01); *C02F 1/5236* (2013.01); *C02F 1/725* (2013.01);
(Continued)

(58) Field of Classification Search
CPC .. C02F 5/10; C02F 1/42; C02F 1/5236; C02F 1/725; C02F 5/02; C02F 2001/425; C02F 2201/006; C02F 2303/22; E03B 7/074
See application file for complete search history.

(56) References Cited

U.S. PATENT DOCUMENTS 3,359,199 A    12/1967  Schmidt
3,496,740 A    2/1970   Borochaner
(Continued)

FOREIGN PATENT DOCUMENTS

DE    10020437 A1    11/2001
GB    2020266 A      5/1979
(Continued)

OTHER PUBLICATIONS

DOW Water Solutions (Year: 2017).*
(Continued)

*Primary Examiner* — Alexander Markoff
(74) *Attorney, Agent, or Firm* — McKee, Voorhees & Sease, PLC

(57) ABSTRACT

The present invention is related to methods, apparatuses, and compositions for controlling water hardness. The methods, apparatuses and compositions also reduce scale formation. The present invention includes substantially water insoluble resin materials. The resin materials may be loaded with a plurality of cations.

12 Claims, 19 Drawing Sheets

Related U.S. Application Data application No. 12/764,621, filed on Apr. 21, 2010, now abandoned.

(60) Provisional application No. 61/261,610, filed on Nov. 16, 2009, provisional application No. 61/171,145, filed on Apr. 21, 2009.

(51) Int. Cl.
  *C02F 1/52* (2023.01)
  *C02F 1/72* (2023.01)
  *C02F 5/02* (2023.01)
  *E03B 7/07* (2006.01)

(52) U.S. Cl.
  CPC ............... *C02F 5/02* (2013.01); *E03B 7/074* (2013.01); *C02F 2001/425* (2013.01); *C02F 2201/006* (2013.01); *C02F 2303/22* (2013.01)

(56) References Cited

U.S. PATENT DOCUMENTS

| | | | |
|---|---|---|---|
| 4,035,257 A | 7/1977 | Cherney | |
| 4,120,653 A | 10/1978 | Smolka | |
| 4,828,752 A | 5/1989 | Nagarajan | |
| 4,894,168 A | 1/1990 | Holl et al. | |
| 5,814,224 A | 9/1998 | Khamizov et al. | |
| 2001/0037976 A1 | 11/2001 | Blonigen et al. | |
| 2003/0196960 A1 | 10/2003 | Hughes | |
| 2005/0194319 A1 | 9/2005 | Wegner | |
| 2005/0210745 A1 | 12/2005 | Grott | |
| 2008/0287335 A1 | 11/2008 | Smith | |
| 2009/0054287 A1 | 2/2009 | Smith et al. | |
| 2010/0068343 A1 | 3/2010 | Johann et al. | |
| 2020/0331786 A1* | 10/2020 | Monrud | C02F 1/725 |
| 2021/0009452 A1* | 1/2021 | Monrud | C02F 1/42 |

FOREIGN PATENT DOCUMENTS

| | | | |
|---|---|---|---|
| JP | 2001121004 A | 1/2016 | |
| WO | 0130495 A1 | 5/2001 | |
| WO | 2008065099 A1 | 6/2008 | |
| WO | 2008137785 A2 | 11/2008 | |
| WO | 2010122508 A2 | 10/2010 | |

OTHER PUBLICATIONS

European Patent Office, "Examination Report", issued in connection to European Patent Application 10766732.1, dated Jan. 22, 2016, 5 pages. Jan. 22, 2016.

Amberlite® IRC-76-L 2000.

Lewatit-S-8528-L, Product Information, 9 pages, Oct. 13, 2011.

Rohm and Haas, "Ion Exchange for Dummies", Lenntech, 9 pages, Sep. 2008.

"Water Softening Filter Cartridges To Remove Hardness From Water," Applied Membranes Inc., [retrieved on Jun. 9, 2022]. Retrieved from the Internet: <URL:https://appliedmembranes.com/water-softening-filter-cartridges-to-remove-hardness-from-water.html>, pp. 1-2.

\* cited by examiner

Booster heater with untreated water (control)

Booster heater with treated water

METHODS AND APPARATUS FOR CONTROLLING WATER HARDNESS

CROSS REFERENCE TO RELATED APPLICATIONS

This Application is a continuation of U.S. application Ser. No. 15/000,919, filed Jan. 19, 2016, which is a divisional of U.S. application Ser. No. 12/764,621 filed on Apr. 21, 2010, which claims priority to provisional application of U.S. Ser. No. 61/261,610 filed Nov. 16, 2009 and provisional application U.S. Ser. No. 61/171,145 filed Apr. 21, 2009, which are hereby incorporated by reference in their entireties.

FIELD OF THE INVENTION

The present invention relates to methods, apparatuses, and systems for controlling water hardness, and scale formation. In particular, the invention relates to methods, apparatuses and systems that include a substantially water insoluble resin material that aids in controlling water hardness, without substantially altering the composition of the water treated. Methods for inhibiting or reducing scale formation are also provided. The present invention also relates to methods of employing treated water, for example, in cleaning processes.

BACKGROUND OF THE INVENTION

Detergents contain numerous components to improve the cleaning activity of the detergent. For example, detergents often contain components to counteract the effects of water hardness. Hard water is known to reduce the efficacy of detergents, by forming films on surfaces, and reacting with detergent components making them less functional in the cleaning process. Calcium is a divalent ion known to bind soils to surfaces, creating a film, and a making the soil more difficult to remove.

One method for counteracting this includes adding chelating agents or sequestrants into detersive compositions that are intended to be mixed with hard water in an amount sufficient to handle the hardness. However, in many instances the water hardness exceeds the chelating capacity of the composition. As a result, free calcium ions may be available to attack active components of the composition, to cause corrosion or precipitation, or to cause other deleterious effects, such as poor cleaning effectiveness or lime scale build up. Further, chelators and sequestrants (e.g., phosphates and NTA) have been found to cause environmental or health issues.

Another method for addressing water hardness issues currently used is to soften water via ion exchange, e.g., by exchanging the calcium and magnesium ions in the water with sodium associated with a resin bed in a water softening unit. The calcium and magnesium adhere to a resin in the softener. When the resin becomes saturated it is necessary to regenerate it using large amounts of sodium chloride dissolved in water. The sodium displaces the calcium and magnesium, which is flushed out in a briny solution along with the chloride from the added sodium chloride. When water softeners regenerate they produce a waste stream that contains significant amounts of chloride, including calcium and magnesium salts, creating a burden on the system, e.g., sewer system, in which they are disposed of, including a multitude of downstream water re-use applications like potable water usages and agriculture. Further, traditional water softeners add to the salt content in discharge surface waters, which has become an environmental issue in certain locations.

SUMMARY

In some aspects, the present invention relates to an apparatus for treating a water source. The apparatus comprises an inlet for providing the water to a first treatment reservoir. A water treatment composition comprising a substantially water insoluble resin material loaded with a plurality of one or more multivalent cations, is contained within the treatment reservoir. The apparatus also includes an outlet fluidly connected to the first treatment reservoir, wherein the outlet provides treated water from the treatment reservoir. In some embodiments, the water treatment composition does not precipitate water hardness ions out of a source of water when contacted with the water. In some embodiments, the apparatus is located in an automatic washing system. In other embodiments, the apparatus is located upstream from an automatic washing machine. The automatic washing machine is selected from the group consisting of an automatic ware washing machine, vehicle washing system, instrument washer, clean in place system, food processing cleaning system, bottle washer, and an automatic laundry washing machine in some embodiments.

In other aspects, the present invention relates to methods for treating water comprising contacting a water treatment composition comprising a substantially water insoluble resin material loaded with a plurality of one or more multivalent cations, with a water source.

In other aspects, the present invention relates to methods of using a treated water source to clean an article. The method includes treating a water source. The step of treating the water source comprises contacting a water treatment composition comprising a substantially water insoluble resin material loaded with a plurality of one or more multivalent cations with a water source to form a treated water source. The method includes forming a use solution with the treated water and a detergent, and contacting the article with the use solution such that the article is cleaned.

In still yet other aspects, the present invention relates to methods for reducing scale formation in an aqueous system comprising contacting the aqueous system with a composition consisting essentially of a substantially water insoluble resin material loaded with a plurality of multivalent cations, such that scale formation in the aqueous system is reduced.

In other aspects, the present invention relates to methods for manufacturing a water treatment device. The methods include: loading a composition comprising a substantially water insoluble resin material into a treatment reservoir, wherein said treatment reservoir comprises an inlet and an outlet; and exhausting the resin material, wherein said step of exhausting the resin material comprises loading a surface of the resin material with a plurality of multivalent cations.

In some aspects, the present invention relates to methods for reducing scale formation comprising providing about 10 to about 1000 parts per billion of a substantially water insoluble resin material to a water source, such that scale formation is reduced. In other aspects, the present invention relates to methods for reducing scale formation, comprising providing about 10 to about 1000 parts per billion of a water soluble polymer material obtained from a substantially water insoluble resin material, to a water source.

In other aspects, the present invention relates to a water treatment composition consisting essentially of a source of substantially water insoluble resin material, wherein said resin material is loaded with a plurality of cations selected from the group consisting of a source of column 1a, 2a or 3a elements from the Periodic Table, wherein said cations do not include calcium.

DETAILED DESCRIPTION OF THE INVENTION

Figure 1:
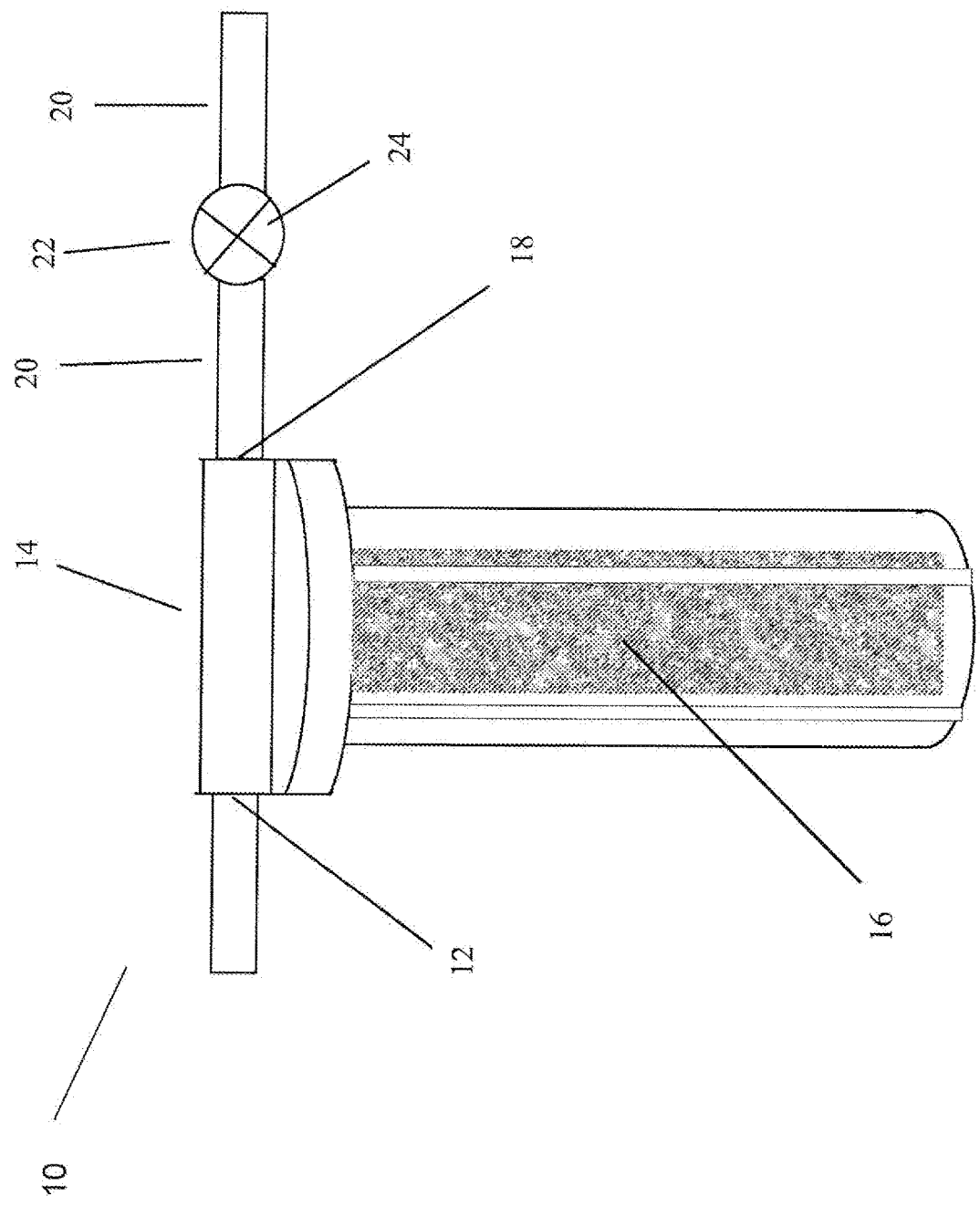
FIG. 1 is a schematic of an exemplary water treatment apparatus of the present invention.

In some aspects, the present invention relates to an apparatus for treating a water source, and methods of use thereof. The apparatus may include a water treatment composition. Water treatment compositions suitable for use in the present invention include a substantially water insoluble resin material. The resin material may be provided loaded with a plurality of multivalent cations. In other embodiments, the resin material may be provided with a plurality of cations selected from the group consisting of alkali metal cations, alkali earth metal cations, metal cations from group IIIa of the periodic table, and combinations thereof. The apparatuses of the present invention are capable of controlling water hardness, and reducing the formation of scale on surfaces contacted with water treated using the apparatuses. However, unlike other water hardness controlling devices, the apparatuses of the present invention do not cause a substance to precipitate out of solution. Nor do the apparatuses of the present invention control water hardness by ion exchange mechanisms.

So that the invention may be more readily understood certain terms are first defined.

As used herein, the terms "builder," "chelating agent," and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, EDTA, DTPA, NTA, citrate, and the like. Sequestrants that can form an insoluble complex include sodium triphosphate, zeolite A, and the like. As used herein, the terms "builder," "chelating agent," and "sequestrant" are synonymous.

As used herein, the term "free of chelating agent" or "substantially free of chelating agent" refers to a composition, mixture, or ingredients that does not contain a chelating agent or sequestrant or to which only a limited amount of a chelating agent, builder, or sequestrant has been added. Should a chelating agent, builder, or sequestrant be present, the amount of a chelating agent, builder, or sequestrant shall be less than about 7 wt %. In some embodiments, such an amount of a chelating agent, builder, or sequestrant is less than about 2 wt %, less then about 0.5 wt %, or less than about 0.1 wt %.

As used herein, the term "lacking an effective amount of chelating agent" refers to a composition, mixture, or ingredients that contains too little chelating agent, builder, or sequestrant to measurably affect the hardness of water.

As used herein, the term "solubilized water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate.

As used herein, the term "water soluble" refers to a compound or composition that can be dissolved in water at a concentration of more than 1 wt-%.

As used herein, the terms "slightly soluble" or "slightly water soluble" refer to a compound or composition that can be dissolved in water only to a concentration of 0.1 to 1.0 wt-%.

As used herein, the term "substantially water insoluble" or "water insoluble" refers to a compound that can be dissolved in water only to a concentration of less than 0.1 wt-%. For example, magnesium oxide is considered to be insoluble as it has a water solubility (wt %) of about 0.00062 in cold water, and about 0.00860 in hot water. Other insoluble compounds for use with the methods of the present invention include, for example: magnesium hydroxide with a water solubility of 0.00090 in cold water and 0.00400 in hot water; aragonite with a water solubility of 0.00153 in cold water and 0.00190 in hot water; and calcite with a water solubility of 0.00140 in cold water and 0.00180 in hot water.

As used herein, the term "threshold agent" refers to a compound that inhibits crystallization of water hardness ions from solution, but that need not form a specific complex with the water hardness ion. This distinguishes a threshold agent from a chelating agent or sequestrant. Threshold agents include a polyacrylate, a polymethacrylate, an olefin/maleic copolymer, and the like.

As used herein, the term "free of threshold agent" or "substantially free of threshold agent" refers to a composition, mixture, or ingredient that does not contain a threshold agent or to which only a limited amount of a threshold agent has been added. Should a threshold agent be present, the amount of a threshold agent shall be less than about 7 wt %. In some embodiments, such an amount of a threshold agent is less than about 2 wt-%. In other embodiments, such an amount of a threshold agent is less then about 0.5 wt-%. In still yet other embodiments, such an amount of a threshold agent is less than about 0.1 wt-%.

As used herein, the term "antiredeposition agent" refers to a compound that helps keep a soil composition suspended in water instead of redepositing onto the object being cleaned.

As used herein, the term "phosphate-free" or "substantially phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than about 1.0 wt %. In some embodiments, the amount of phosphate is less than about 0.5 wt %. In other embodiments, the amount of phosphate is less then about 0.1 wt %. In still yet other embodiments, the amount of phosphate is less than about 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than about 1.0 wt %. In some embodiments, the amount of phosphorous is less than about 0.5 wt %. In other embodiments, the amount of phosphorus is less than about 0.1 wt %. In still yet other embodiments, the amount of phosphorus is less than about 0.01 wt %.

"Cleaning" means to perform or aid in soil removal, bleaching, microbial population reduction, or combination thereof.

As used herein, the term "ware" refers to items such as eating and cooking utensils and dishes, and other hard surfaces such as showers, sinks, toilets, bathtubs, countertops, windows, mirrors, transportation vehicles, and floors. As used herein, the term "warewashing" refers to washing, cleaning, or rinsing ware.

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.,), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "laundry," refers to woven and non-woven fabrics, and textiles. For example, laundry can include, but is not limited to, clothing, bedding, towels and the like.

As used herein, the term "water source," refers to any source of water that can be used with the methods, systems and apparatus of the present invention. Exemplary water sources suitable for use in the present invention include, but are not limited to, water from a municipal water source, or private water system, e.g., a public water supply or a well. The water can be city water, well water, water supplied by a municipal water system, water supplied by a private water system, and/or water directly from the system or well. The water can also include water from a used water reservoir, such as a recycle reservoir used for storage of recycled water, a storage tank, or any combination thereof. In some embodiments, the water source is not an industrial process water, e.g., water produced from a bitumen recovery operation. In other embodiments, the water source is not a waste water stream.

The methods, systems, apparatuses, and compositions of the present invention can include, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

As used herein, the term "about" or "approximately" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

Water Treatment Apparatus

The present invention relates to apparatuses, compositions, and methods for use in controlling water hardness. In some aspects, the apparatuses and compositions of the present invention include a substantially water insoluble resin material. Without wishing to be bound by any particular theory it is thought that the compositions and apparatuses control water hardness without substantially altering the water source. That is, it is thought that the compositions and apparatuses of the present invention do not precipitate a substance out of the water, nor do they control water hardness via a conventional ion exchange mechanism. Further, the apparatuses do not substantially alter the pH or total dissolved solids (TDS) of the water source treated.

Water treated in accordance with the methods and apparatuses of the present invention has many beneficial effects, including, but not limited to: reduction of scale and soiling in areas where hard water can cause soiling: protecting equipment, e.g., industrial equipment, from scale build up: increased cleaning efficacy when used with conventional detersive compositions: and reducing the need for specific chemistries, e.g., those containing threshold agents, chelating agents, or sequestrants, or phosphorous, in downstream cleaning processes.

In some aspects, the apparatuses and compositions of the present invention include a water treatment composition. The water treatment compositions may be in a variety of physical forms. For example, the water treatment composition may be in the form of a sheet, a bead, or a membrane.

In some embodiments, the water treatment composition includes a substantially water insoluble resin material. A variety of resin materials may be used with the apparatuses of the present invention.

In some embodiments, the resin material is an exhausted resin material. As used herein, the term "exhausted resin material" refers to an ion exchange resin material that can control water hardness, but that is incapable of performing an ion exchange function. In some embodiments, an exhausted resin material has a surface that is substantially loaded with a plurality of one or more multivalent cations, and is thus unable to exchange ions with a water source when contacted with a water source. The exhausted resin materials of the present invention do not control water hardness through an ion exchange mechanism. That is, the surface of an exhausted resin material is inert, as it is loaded with a plurality of multivalent cations.

The water treatment composition may include a resin substantially loaded with a plurality of one or more multivalent cations. As used herein, the term "multivalent cations" refers to cations having a valency of 2 or higher. In some embodiments, the multivalent cations include a mixture of calcium and magnesium ions. The calcium and magnesium ions may be loaded on to the resin material at a ratio of from about 1:10 to about 10:1, about 1:5 to about 5:1, about 1:3 to about 3:1, about 1:2 to about 2:1, or from about 1:1 of calcium ions to magnesium ions. In some embodiments, the mixture includes a 2:1 ratio of calcium to magnesium ions.

In other aspects, the water treatment composition includes a substantially water insoluble resin material, wherein the resin material is loaded with a plurality of cations. The cations may be selected from the group consisting of a source of column 1a, 2a or 3a elements from the Periodic Table. In some embodiments, the cations do not include calcium. In some embodiments, the cations are selected from the group consisting of hydrogen ions, sodium ions, magnesium ions, aluminum ions, zinc ions, titanium ions, and mixtures thereof. The resins for use in the present invention may include, or exclude, any one or more than one of these cations.

In some embodiments, the resin material includes an acid cation exchange resin. The acid cation exchange resin may include a weak acid cation exchange resin, a strong acid cation exchange resin, and combinations thereof. Weak acid cation exchange resins suitable for use in the present invention include, but are not limited to, a crosslinked acrylic acid polymer, a crosslinked methacrylic acid polymer, and mixtures thereof. In some embodiments, resin polymers have additional copolymers added. The copolymers include but are not limited to butadiene, ethylene, propylene, acrylonitrile, styrene, vinylidene chloride, vinyl chloride, and derivatives and mixtures thereof.

Commercially available weak acid cation exchange resins are available, and include but are not limited to: C-107 available from Purolite; Amberlite IRC 76 available from Dow; Lewatit CNP 80 WS available form Lanxess; and MAC-3 available from Dow.

Without wishing to be bound by any particular theory, it is thought that in some embodiments, the resin material provides to the water source a substantially low molecular weight polymer material. In some embodiments, the resin material is an acrylic acid polymer that provides a polyacrylate material having a molecular weight of about 150 to about 100,000 to the water source. In other embodiments, the resin material provides a polyacrylate material having a relatively low molecular weight of less than about 20,000 to the water source.

The resin material may be provided in any shape and size, including beads, rods, disks or combinations of more than one shape. In some embodiments, the resin material is selected from the group consisting of a gel type resin structure, a macroporous type resin structure, and combinations thereof. Without wishing to be bound by any particular theory it is thought that the resin particle size may affect the ability of the resin material to control water hardness. For example, in some embodiments, the resin material may have a particle size of from about 0.5 mm to about 1.6 mm. In other embodiments, the resin material may have a particle size as large of 5.0 mm. The resin material may also include a mixture of particle sizes, viz. a mixture of large and small particles.

Other factors that are thought to have an effect on the ability of the resin material to control water hardness include, but are not limited to, the particle size distribution, the amount of cross linking, and the polymers used. In some embodiments, the ability of the resin material to control water hardness is impacted by whether there is a narrow particle size distribution, e.g., a uniformity coefficient of 1.2 or less, or a wide (Gaussian) particle size distribution, e.g., a uniformity coefficient of 1.5 to 1.9.

Further, it is thought that the selectivity of the resin can be modified to tailor the resin to have an affinity for one ion over another. For example, the amount of cross linking and type of polymers included in the resin are thought to impact the selectivity of the resin. A selective affinity for particular ions over other ions may be beneficial in situations where a high affinity for certain ions, e.g., copper, may be damaging, e.g., foul or poison, to the resin itself. The resin material may bind cations by a variety of mechanisms including, but not limited to, by ionic or electrostatic force.

In some embodiments, an acrylic acid polymer resin material is crosslinked with a polyvinyl aromatic composition. Suitable polyvinyl aromatic compositions for use in the present invention include divinyl benzene, trivinyl benzene, divinyl toluene, divinyl xylene, polyvinyl anthracene, and derivatives and mixtures thereof. In some embodiments, the crosslinked acrylic acid polymer is about 0.5% to about 25% crosslinked. In other embodiments, the acrylic acid polymer is less than about 8%, less than about 4% or less than about 2% crosslinked.

In some embodiments, the resin includes a weak acid cation exchange resin having H+ ions attached to the active sites. The resin may then be exhausted, viz. loaded with a plurality of multivalent cations by any of a variety of methods, e.g., by having a water source run over it. In some embodiments, the plurality of multivalent cations includes, but is not limited to, the calcium and magnesium present in the water source. Without wishing to be bound by any particular theory, it is thought that as the water runs over the resin, the calcium and magnesium ions in the water will attach to the resin, thereby neutralizing it. At this point the resin is exhausted as it can no longer exchange ions with the water source.

An example of a water treatment apparatus for use in the present invention is shown in FIG. 1. A schematic of a water treatment apparatus is shown at reference 10. The apparatus includes: an inlet 12 for providing the water source to a treatment reservoir 14; a treatment reservoir 14 including a water treatment composition 16; an outlet 18 for providing treated water from the treatment reservoir; and a treated water delivery line 20. In some embodiments, the treated water delivery line 20 provides water to a selected washing system. In other embodiments, the treated water delivery line 20 provides water to an additional water treatment apparatus. In some embodiments, there is no filter between the outlet and the treated water delivery line. A flow control device 22 such as a valve 24 can be provided in the treated water delivery line 20 to control the flow of the treated water into the selected end use device, e.g., a washing system, or another water treatment device, e.g., a carbon filter, a reverse osmosis filter.

In some embodiments, the water treatment composition is contained within a treatment reservoir. Any reservoir capable of holding the water treatment composition may be used as a treatment reservoir. The reservoir can be for example, a tank, a cartridge, a filter bed of various physical shapes or sizes, or a column. In other embodiments, the treatment reservoir can include a mesh bag containing the water treatment composition. In still yet other embodiments, the resin material may be attached or adhered to a solid substrate. The substrate can include, but is not limited to, a flow-through filter type pad, or paper. The substrate can also be a particulate that can be fluidized.

The treatment reservoir may include an inlet for providing water to the treatment reservoir and an outlet for providing treated water to a desired end use location, e.g., a washing device, another water treatment device. In some embodiments, the inlet is located at the bottom of the reservoir, and the outlet is located at the top of the reservoir. This allows for the water to flow up through the water treatment composition contained within the treatment reservoir.

In some embodiments, the treatment reservoir includes an agitated bed of the water treatment composition. Methods for agitating the composition include, for example, flow of water through a column, by fluidization, mechanical agitation, air sparge, eductor flow, baffles, flow obstructers, static mixers, high flow backwash, recirculation, and combinations thereof. The treatment reservoir can further include a head space above the composition contained therein, in order to allow for a more fluidized bed. In some embodiments, the resin material has a density slightly higher than the density of water to maximize fluidization and/or agitation of the resin material.

In some embodiments, the inlet can further include a pressurized spray nozzle or eductor nozzle. The spray nozzle can provide the water at an increased force to the treatment reservoir. This increased pressurized force can increase the agitation of the water treatment composition and can circulate the resin through the eductor nozzle. In some embodiments, the spray nozzle provides the water to the treatment reservoir at a rate of about 5 feet per minute to about 200 feet per min.

The water treatment apparatuses of the present invention are designed to handle increased water velocities compared to conventional ion exchange water softeners. For example, a conventional ion exchange device is designed for a flow rate of about 0.3 to about 3.0 feet per minute of water velocity. This flow rate is important to allow time for the diffusion of ions to the surface of the resin from the water for the ion exchange process to occur. Without wishing to be bound by any particular theory, it is thought that because the present water treatment apparatus does not operate by an ion exchange mechanism, the flow rate can be increased through the apparatus. That is, a sufficient amount of time for an ion exchange to occur is not necessary using an exemplary apparatus of the present invention. For example, in some embodiments, the apparatuses of the present invention have a flow through rate of about 5 to about 200 feet per minute, about 20 to about 175 feet per minute, or about 50 to about 150 feet per minute.

In some embodiments, the treatment reservoir includes a portable, removable cartridge. The apparatuses of the present invention can control water hardness while requiring a lower amount of water treatment composition in the treatment reservoir compared to conventional water treatment devices, e.g., ion exchange devices. For example, in some embodiments, the bed depth of the composition in the treatment reservoir is less than about 2 feet, or less than about 1.5 feet. Conventional weak acid resins used in ion exchange water softening applications are designed for bed depths of 2.6 feet for water treatment rates of about 2 to about 20 gallons per minute.

The apparatuses of the present invention can include one or more treatment reservoirs. For example, two, three or four treatment reservoirs containing the same or different water treatment compositions can be used. The one or more treatment reservoirs can be provided in any arrangement, for example, they may be provided in series, or in parallel.

In some embodiments, the entire treatment reservoir can be removable and replaceable. In other embodiments, the treatment reservoir can be configured such that water treatment composition contained within the treatment reservoir is removable and replaceable. In some embodiments, the treatment reservoir includes a removable, portable, exchangeable cartridge including a water treatment composition.

In some embodiments, an additional functional ingredient may be included in the treatment reservoir. The additional functional ingredients can be included within the treatment reservoir, or they can be provided to the treatment reservoir from an external source, e.g., an additional functional ingredient inlet. The additional functional ingredients can be added directly to the water source to be treated prior to the water source entering the treatment apparatus. Alternatively, the additional ingredient can be added to the treatment reservoir prior to the water source being passed through the reservoir.

Additional functional ingredients suitable for use with the apparatus of the present invention include any materials that impart beneficial properties to the water treatment composition, the water source being treated, or any combination thereof. For example, functional ingredients may be added that aid in the prevention of "cementing" of the catalyst, i.e., agglomeration of the particles, as it is contacted with a water source.

In some embodiments, an oxidant is included as an additional functional ingredient. Oxidants for use with the apparatus and methods of the invention include, but are not limited to, halogens and substances rich in halogen elements. Exemplary oxidants for use with the apparatus and methods of the present invention include, but are not limited to, oxygen, ozone, chlorine sources including hypochlorite, fluorine, iodine, bromine, various peroxides including hydrogen peroxide, nitric acid and nitric oxide. In other embodiments, a gaseous oxidant is provided to the water source before, or at substantially the same time as the water source enters the treatment apparatus. For example, air containing oxygen can be injected into the water source prior to the apparatus via an air pump or aspirator.

Methods of Use

In some aspects, the present invention provides methods for controlling water hardness and/or reducing scale formation. The methods may include contacting a water treatment composition comprising a substantially water insoluble resin material with a water source. In some embodiments, the water treatment composition is contained within a treatment reservoir. In other embodiments, the water treatment composition is loaded with a plurality of multivalent cations.

The step of contacting can include, but is not limited to, running the water source over or through the water treatment composition. The water treatment composition may be contained within a treatment reservoir, e.g., a column, cartridge, mesh bag or tank, of an apparatus of the present invention. The contact time is dependent on a variety of factors, including, for example, the pH of the water source, the hardness of the water source, and the temperature of the water source.

In some embodiments, the method includes heating the water source prior to the step of contacting the composition. Any means of heating the water source may be used with the methods and apparatuses of the present invention. In some embodiments, the water is heated to a temperature of about 30° C. to about 90° C.

In other embodiments, the methods of the present invention may include the step of increasing the pH of the water source. The step of increasing the pH of the water source may occur prior to the step of contacting the water treatment composition, during the step of contacting the composition, or both prior to and during the step of contacting the composition. For example, to increase the pH of the water source prior to the step of contacting the water treatment composition, a source of calcite may be added to the water source. To increase the pH of the water source during the step of contacting, a source of calcite may be added to the treatment reservoir. The pH of the water source may be increased, for example, to a pH of about 8 to about 10.

The methods, apparatuses, and compositions of the invention may be used for a variety of purposes. For example, an apparatus for employing the water treatment methods of the present invention can be connected to the water main of a house or business. The apparatus can be employed in line before the hot water heater, or after the hot water heater. Thus, an apparatus of the present invention can be used to control water hardness and/or reduce scale formation in hot, cold and room temperature water sources.

Once the water has been treated, the treated water may be provided to an automatic washing machine from the treated water delivery line of the apparatus. The apparatus can be located in a variety of locations relative to the washing machine. For example, the apparatus may be upstream from the feed line of the washing machine, or within the washing machine. Exemplary automatic washing machines suitable for use with the apparatuses and methods of the present invention include, but are not limited to, an automatic ware washing machine, a vehicle washing system, an instrument washer, a clean in place system, a food processing cleaning system, a bottle washer, and an automatic laundry washing machine. Alternatively, the treated water may be used in a manual washing system. Any automatic washing machine or manual washing process that would benefit from the use of water treated in accordance with the methods of the present invention can be used.

The water treatment methods and apparatuses of the present invention can be used in a variety of industrial and domestic applications. The water treatment methods and apparatuses can be employed in a residential setting or in a commercial setting, e.g., in a restaurant, hotel, hospital. For example, a water treatment method, system, or apparatus of the present invention can be used in: ware washing applications, e.g., washing eating and cooking utensils and dishes, and other hard surfaces such as showers, sinks, toilets, bathtubs, countertops, windows, mirrors, and floors; in laundry applications, e.g., to treat water used in an automatic textile washing machine at the pre-treatment, washing, souring, softening, and/or rinsing stages; in vehicle care applications, e.g., to treat water used for pre-rinsing, e.g., an alkaline presoak and/or low pH presoak, washing, polishing, and rinsing a vehicle; industrial applications, e.g., cooling towers, boilers, industrial equipment including heat exchangers; in food service applications, e.g., to treat water lines for coffee and tea brewers, espresso machines, ice machines, pasta cookers, water heaters, booster heaters, steamers and/or proofers; in healthcare instrument care applications, e.g., soaking, cleaning, and/or rinsing surgical instruments, treating feedwater to autoclave sterilizers; and in feedwater for various applications such as humidifiers, hot tubs, and swimming pools. In some embodiments, an apparatus of the present invention can be used to treat water provided to an ice machine.

In some embodiments, the water treatment methods and systems of the present invention can be applied at the point of use. That is, a water treatment composition, method, system, or apparatus of the present invention can be applied to a water source upstream of an application such as a washing system. In some embodiments, the water treatment is applied immediately prior to the desired end use of the water source. For example, an apparatus of the present invention could be employed to a water line connected to a household or restaurant appliance, e.g., a coffee maker, an espresso machine, an ice machine. An apparatus employing the methods of the present invention may also be located in a washing system.

Apparatuses of the present invention can also be included as part of an appliance which uses a water source, e.g., a water treatment system built into an automatic or manual washing system, a coffee maker, an ice machine, a steam table, a booster heater, a grocery mister, a humidifier, or any other system which may benefit from the use of treated water. The apparatuses of the present invention can be used with any appliance or device which can provide a water source that would benefit from treatment using the apparatuses of the present invention. For example, the apparatuses can be used with a hose, e.g., a garden hose, or treat water that is provided to an electrolytic cell.

In some embodiments, an apparatus of the present invention including a treatment reservoir may be used with a washing machine in a variety of ways. In some embodiments, the treatment reservoir may be connected to a detergent dispensing device. The treatment reservoir may be used to supply treated water to a washing system and/or to a rinsing system of a washing machine. In some embodiments, the treatment reservoir may be used to supply a mixture of treated water and detergent to a washing system.

In some embodiments, treated water can be combined with a detersive composition and the combination provided to a washing machine as a use solution. Use of a treated water source has many advantages in downstream cleaning processes compared to use of a non-treated water source. For example, use of a water source treated in accordance with the methods of the present invention increases the efficacy of conventional detergents. It is known that hardness ions combine with soap and detergents to form a scale or scum. Further, hardness ions limit the amount of lather formed with soaps and detergents. Without wishing to be bound by any particular theory, it is thought that by reducing the amount of these hardness ions the amount of these detrimental side effects can be reduced.

Further, use of a treated water source also allows for the use of specific environmentally friendly detersive compositions, e.g., those substantially free of or free of builders, chelants, or sequestrants, or phosphorous.

Any detersive composition can be used with water treated according to the present invention. For example, a cleaning composition, a rinse agent composition or a drying agent composition can be combined with treated water to form a use solution. The articles to be cleaned and/or rinsed are then contacted with the use solution. Exemplary detergent compositions include warewashing detergent compositions, laundry detergent compositions, CIP detergent compositions, environmental cleaning compositions, hard surface cleaning compositions (such as those for use on counters or floors), motor vehicle washing compositions, and glass cleaning compositions. Exemplary rinse agent compositions include those compositions used to reduce streaking or filming on a surface such as glass. Exemplary drying agent compositions include dewatering compositions. In the vehicle washing industry, it is often desirable to include a dewatering step where a sheeting or beading agent is applied to the vehicle exterior.

In some embodiments, the detersive composition for use with the methods of the present invention includes a detergent that is substantially free of a chelant, builder, sequestrant, and/or threshold agent, e.g., an aminocarboxylic acid, a condensed phosphate, a phosphonate, a polyacrylate, or the like. Without wishing to be bound by any particular theory, it is thought that because the methods and apparatus of the present invention reduce the negative effects of hardness ions in the water source, when used with a detergent, there is a substantially reduced or eliminated need to include chelating agents, builders, sequestrants, or threshold agents in the detergent composition in order to handle the hardness ions.

In some embodiments, the detersive composition may include other additives, including conventional additives such as bleaching agents, hardening agents or solubility modifiers, defoamers, anti-redeposition agents, threshold agents, stabilizers, dispersants, enzymes, surfactants, aesthetic enhancing agents (i.e., dye, perfume), and the like. Adjuvants and other additive ingredients will vary according to the type of composition being manufactured. It should be understood that these additives are optional and need not be included in the cleaning composition. When they are included, they can be included in an amount that provides for the effectiveness of the particular type of component.

In some embodiments, the apparatuses and methods of the present invention may be used to treat water that is then provided to another water treatment device. That is, in some embodiments, an apparatus of the invention is located upstream from a water treatment device. Exemplary water treatment devices include, but are not limited to, a reverse osmosis water treatment device, a heat exchange water treatment device, a carbon filter, and mixtures thereof.

In some aspects, the present invention also provides methods for manufacturing a water treatment device of the present invention. The methods include loading a water treatment composition including a substantially water insoluble resin material into a treatment reservoir. The treatment reservoir includes an inlet and an outlet. The methods further include exhausting the resin material. The step of exhausting the resin material may include loading a surface of the resin material with a plurality of multivalent cations.

In other aspects, the present invention provides methods for reducing scale formation. The methods include providing an effective amount of a substantially water insoluble resin material to a water source such that scale formation is reduced when an article is contacted with the treated water source. In some embodiments, an effective amount of a substantially water insoluble resin includes about 10 to about 4000, about 10 to about 2000, about 10 to about 1000, or about 10 to about 600 parts per billion of the material. In some embodiments, the effective amount is a non-thickening amount. That is, an amount that if provided in a detergent use solution, would not substantially thicken the detergent use solution.

In other aspects, the present invention provides methods for reducing scale formation including providing an effective amount of a water soluble polymer material. In some embodiments, the polymer material is obtained from a water treatment composition, e.g., a substantially water insoluble resin material. In other embodiments, the polymer material comprises a polyacrylate material. In some embodiments, the polyacrylate material includes a substantially low molecular weight polyacrylate material to the water source. In some embodiments, an effective amount of the water soluble low molecular weight polymer material includes about 10 to about 4000, about 10 to about 2000, about 10 to about 1000, or about 10 to about 600 parts per billion of the material. In other embodiments, the effective amount is a non-thickening amount. That is, an amount that if provided in a detergent use solution, would not substantially thicken the detergent use solution.

EXAMPLES

The present invention is more particularly described in the following examples that are intended as illustrations only. Unless otherwise noted, all parts, percentages, and ratios reported in the following examples are on a weight basis, and all reagents used in the examples were obtained, or are available, from the chemical suppliers described below, or may be synthesized by conventional techniques.

Example 1

Three 1 pound resin samples were prepared by loading them with H+, Ca++, and Mg++. The magnesium loaded sample was prepared according to the following procedure. A weak acid cation resin, Lewatit S 8528 obtained from the Lanxess Company, was soaked is 500 grams of NaOH beads and 2500 ml of softened water for 24 hours. The pH was approximately 12-13. After soaking, the resin was then rinsed thoroughly with softened water three times until the pH of the rinse water was below 11. The resin was soaked in 2500 ml of softened water with 700 grams of a $MgCl_2 \cdot 6H_2O$ composition for 4 days. The resin was thoroughly rinsed with softened water three times. The final pH of the rinse water was approximately 7.5-8.5.

To load the resin with Ca++, the same procedure was used as described above for the MG++ resin, only the resin was soaked with $CaCl_2$ composition. The H+ form of the resin, was the resin itself, without any cations loaded onto it.

Figure 2A:
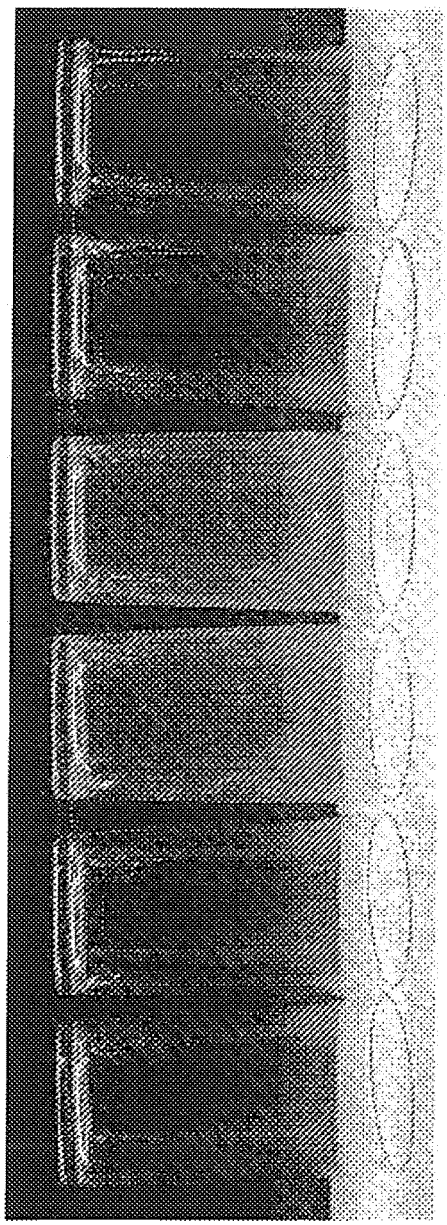
FIGS. 2A and 2B are photographs of test glasses washed with untreated water, water treated with a calcium bound resin, water treated with a magnesium bound resin, and water treated with a hydrogen bound resin.

Water was then treated with each of the resin samples and compared for scaling tendencies in a warewashing machine. The feedwater to the dishmachine was thus treated with a H+ weak acid cation resin, a Ca++ weak acid cation resin, or a Mg++ weak acid cation resin in three separate but equivalent tests. Each of the resin samples were first pre-conditioned by running hard (17 gpg) water through a flow-through reservoir to drain. After approximately 1000 gallons of water flow, the resin/reservoir systems were connected to the dishmachine and evaluated for scaling tendencies on glassware. The results of this comparison test are shown in FIG. 2A. After this dishmachine/glassware scaling test, the resin samples were further conditioned by running hard water through a flow-through reservoir to drain for an additional 4000 gallons and therefore each resin had treated a total of about 5000 gallons of water. The resin was confirmed to be exhausted of capacity at this point by measuring the water hardness of the water, i.e., the calcium and magnesium amounts in the water were the same after treatment, as before treatment.

Figure 2B:
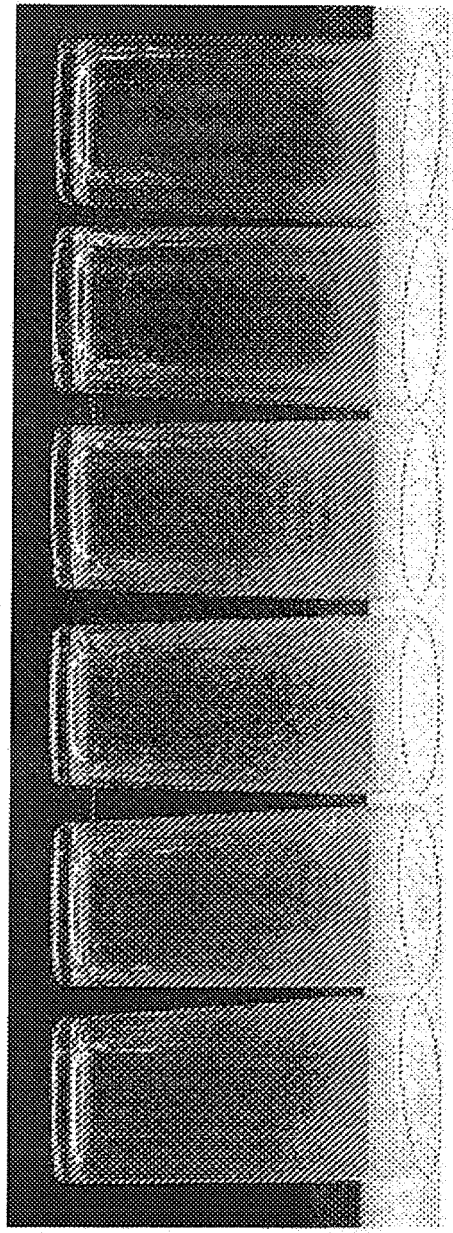

A second set of dishmachine/glassware scaling tests were then conducted, again without detergent and those results are shown in FIG. 2B.

The control glasses (not shown) had heavy scale. The first two glasses from the left in each FIGS. 2A and 2B were treated with H+ bound resin. The third and fourth glass from the left in each figure were treated with Ca2+ bound resin, and the fifth and sixth glass from the left in each figure were treated with a Mg2+ bound resin. As seen in FIG. 2A, the H+ resin and the Mg2+ resin showed no visible scale in the test using resin that had previously treated 1000 gallons of water. The two Ca2+ resin showed a clearly visible scale. Referring to FIG. 2B, in which each of the resin systems had previously treated 5000 gallons of water, the H+ resin resulted in a slight scale on the glassware. The Ca2+ resin showed a slightly heavier scale, and the Mg2+ resin showed little or no visible scale.

Example 2

Figure 3:
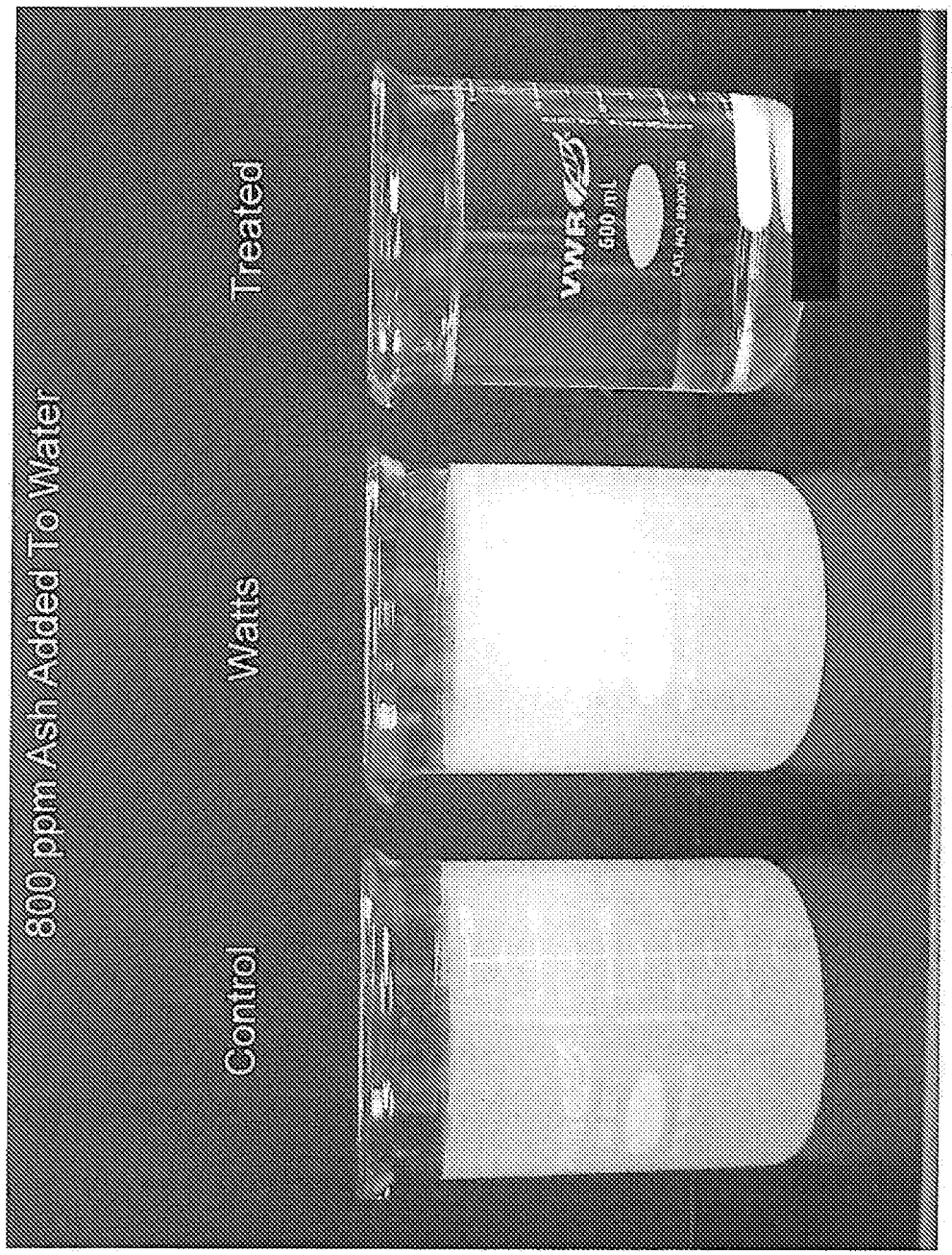
FIG. 3 is a photograph of the results of a limescale test using water treated in accordance with embodiments of the present invention, compared to water treated using a known water hardness precipitation device, and a control sample.

Water with 17 grains of water hardness was treated with two pounds of Watts OneFlow media, commercially available from Watts, at a rate of about 5 gallons per minute. In addition, water with 17 grains of water hardness was treated with a magnesium loaded weak acid resin according to the present invention at the same conditions. An alkalinity source including 800 ppm of sodium carbonate was added to each of these water samples, as well as to a control sample of untreated water. The results are shown in FIG. 3. As can be seen from this Figure, both the control and the Watts treated water had a signification precipitation of water hardness. The water treated according to the present invention (shown as the right most beaker) showed no signs of a precipitate.

Example 3

A test was run to measure the limescale build up control using various commercially available water treatment materials. Two separate tests were run. The first test was a 100 cycle dishmachine test. A door type dishmachine (Hobart AM-15) was used. The selected test apparatus was connected to the inlet water to the dishmachine so that all of the rinse water for the machine was treated. The inlet water had a hardness of 17 grains. Glassware was placed inside the dishmachine in a glassware rack. The machine was run normally for 100 cycles. No chemicals, e.g., detergents, rinse aids, other than the treatment apparatuses were used in this test. After the 100 cycles were complete, the glassware was removed and allowed to air dry. Photos of the glasses were taken. A light box was used to determine reflectance which is a direct correlation to the amount of scale present. The photos and light box scores were compared for the different water treatments tested. A light box score differing by 10,000 is considered significant.

Figure 4A:
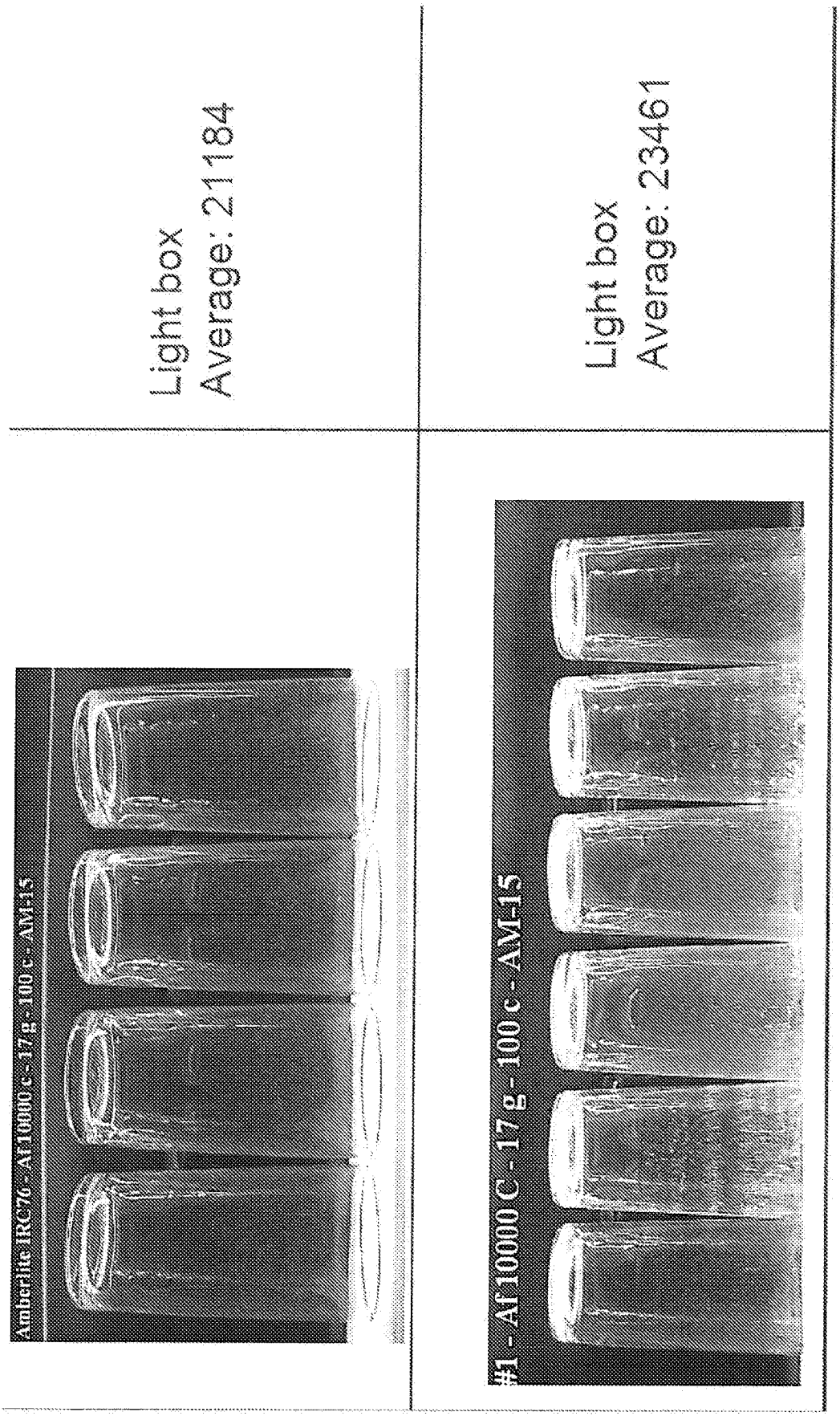
FIGS. 4A and 4B are photographs of test glasses in a 100 cycle test using varying water treatments.
Figure 4B:
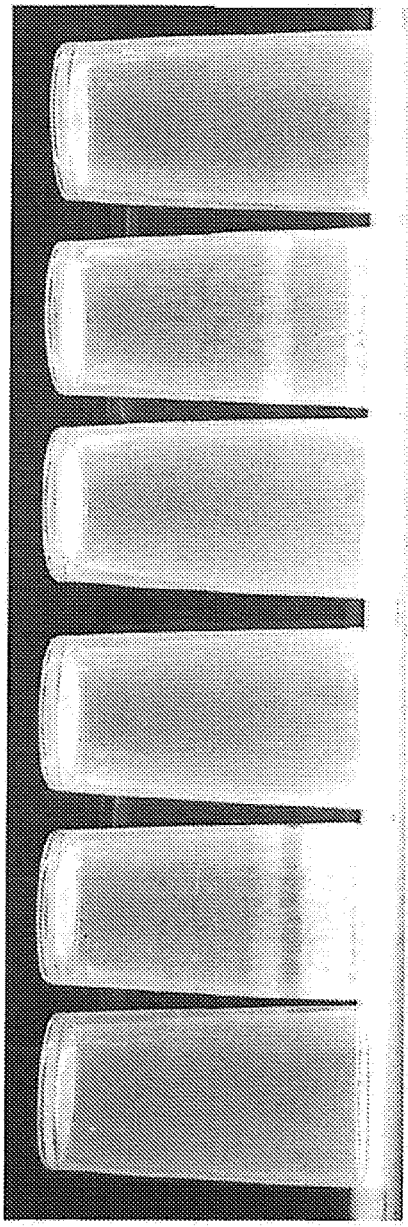
Figure 4B:
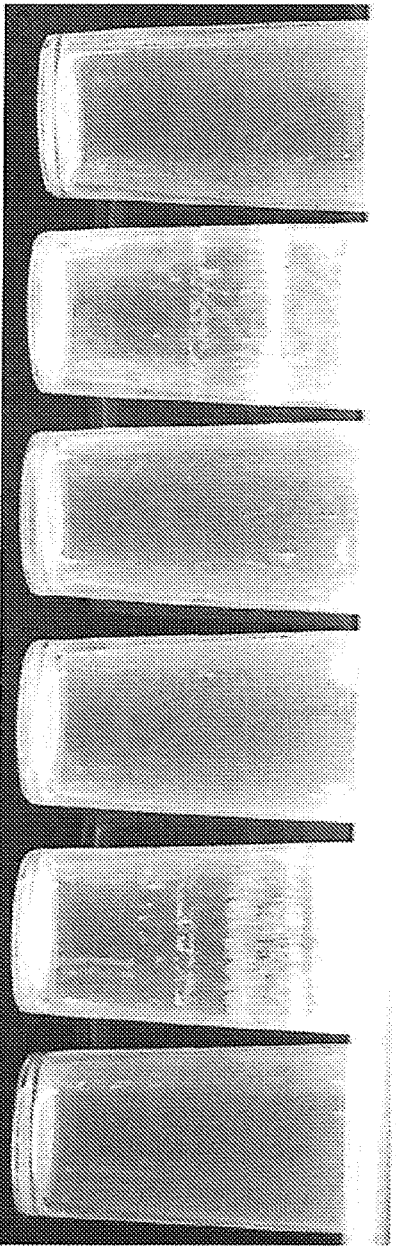

For this 100 cycle test the following media were tested: Amberlite IRC 76 commercially available from Dow; Lewatit S-8528, commercially available from Lanxess; Watts OneFlow Media, commercially available from Watts; and Filtersorb SP3, commercially available from CWG USA. The results are shown in FIGS. 4A and 4B.

As can be seen from these Figures, relatively good results, viz. low scaling, were achieved using the IRC-76 and Lanxess resins. As is seen in FIG. 4B, poor results were achieved using the Watts and Filtersorb materials.

Another test was run to measure the limescale control in applications where cleaning chemicals are present. This test was run similar to the protocol for the 100 cycle test described above, however, 850 ppm of sodium carbonate was added to the wash tank of the dishmachine. This level of alkalinity was maintained throughout the test. Also, the test was only run for 10 cycles.

Figure 5:
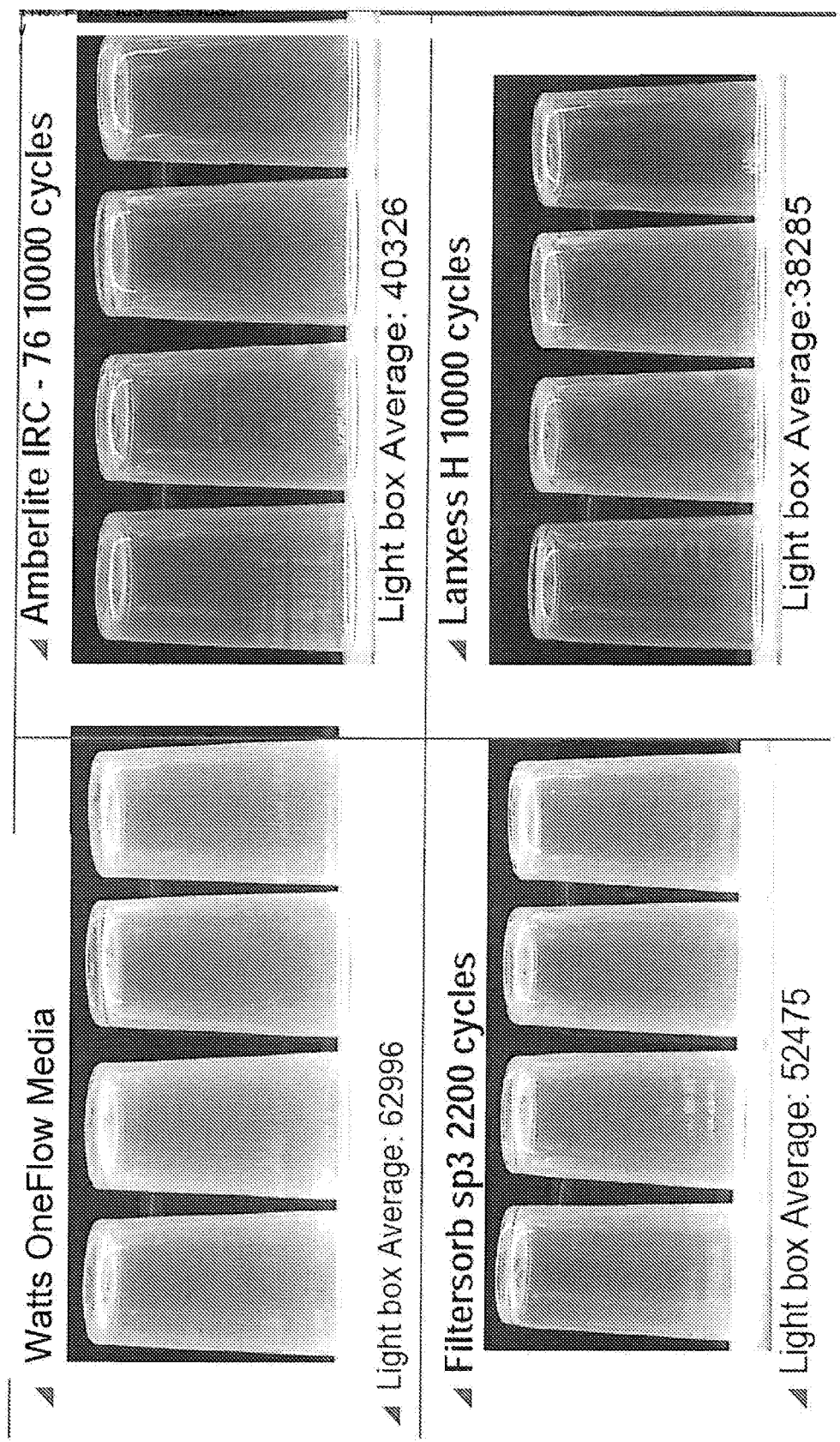
FIG. 5 is a photograph of test glasses in a 100 cycle test with a source alkalinity provided using varying water treatments.

The results of this test are shown in FIG. 5. As can be seen from this Figure, better results were obtained using the exhausted IRC-76 and Lanxess resins compared to the OneFlow and SP-3 media.

Example 4

An experiment was run to determine the ability of a substance to prevent scaling in hard water under alkaline conditions. A test substance was formed by combining 17 grain hard water with 0.4 mg of a substance removed from a used Mg+ loaded resin (a resin as described above in Example 1). Without wishing to be bound by any particular theory, it is thought that the substance removed from the resin included organic material that includes, at least in part, a polyacrylate material. Although manually removed, viz. extracted from the resin surface, for the purposes of this example, it is thought that in practice this material would be removed from the resin by the flow of water over and through the resin. The 0.4 mg removed was equivalent to 800 parts per billion of this material. 0.1 grams of dense ash (200 ppm ash) was added to this solution. The solution was stirred and observed for scale formation, e.g., cloudiness of the solution. The test solution was compared to a control solution containing only 17 grain hard water and an equivalent amount of ash as the test solution. The solutions were observed at two and five minutes. At the two minute time point, the test solution remained clear, while the control solution had a cloudy, white appearance. At the five minute time point, the test solution was slight cloudier than it originally appeared, but was still much clearer than the control solution, which had increased in cloudiness.

Example 5

A test was run to determine the effect of a water treatment apparatus as a point of use treatment for booster heaters. In this test, two booster heaters were run concurrently. One booster heater used 17 grain per gallon water. The second booster heater used 17 grain per gallon water which was pretreated with the water treatment apparatus. Both booster heaters were run for five consecutive days. They were programmed with a repeating pattern of "on" for three hours followed by three hours of down time. During the three "on" hours, water was run through the booster heater at 5 gallons per minute for one minute, followed by one minute of zero flow. During this "on" time, the booster heater was set to heat the water to a temperature of 185° F.

Figure 6:
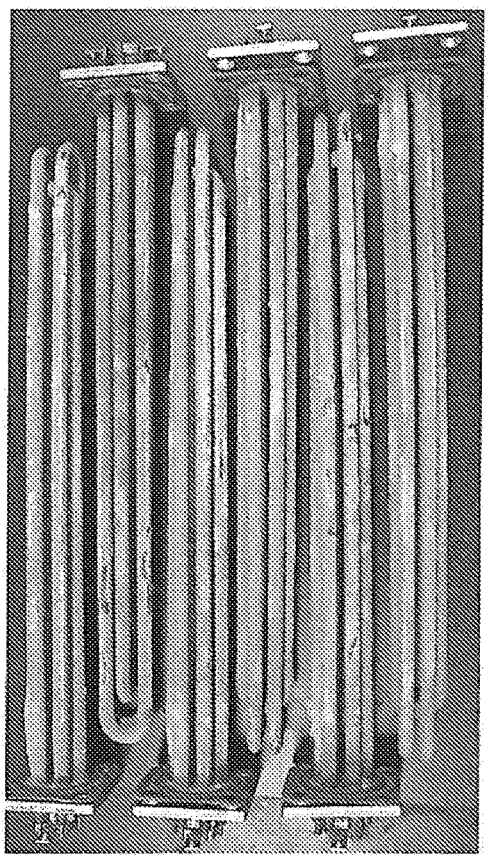
FIG. 6 is a photograph of booster heater elements after a five day test run with and without a point of use water treatment system in accordance with embodiments of the present invention.
Figure 6:
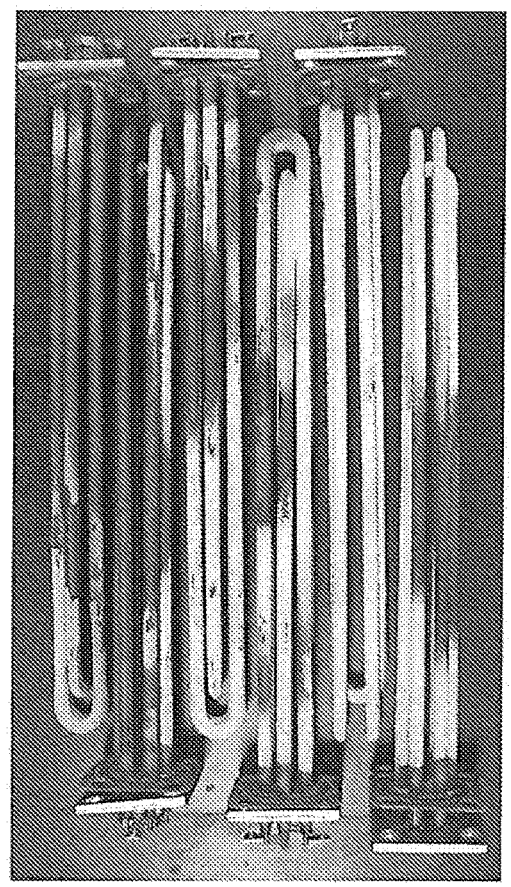

The results are shown in FIG. 6. As can be seen in this figure, the booster heater that used treated water had far less scaling than the control booster heater. The amount of scale on the elements and the thickness of the scale were substantially reduced with the treated water compared to the control.

Example 6

A test was run to evaluate the effects of water treated with an apparatus in accordance with embodiments of the present invention when used with a reverse osmosis membrane. A five gallon bucket was filled with either treated or non-treated 17 grain per gallon water. Treated water was water that had been run through two 0.75 pound cartridges containing an exhausted ion exchange resin material. The ion exchange material was exhausted by having approximately 3,700 gallons of 17 grain per gallon water run through it. The two cartridges used to treat the water were arranged in series. The untreated water was just 17 grain per gallon water.

The treated and untreated water were circulated through a reverse osmosis system containing a BW30 membrane, commercially available from Dow. The membrane tested had a surface area of 0.5 feet by 0.5 feet. The treated and untreated water was passed through the membrane system at a constant pressure of 400 PSI. The temperature of the water was maintained at between 70° F. and 76° F. Samples were taken 4 to 5 times a day, and tested for the total dissolved solids (TDS) concentration. The permeate flow was also measured.

Figure 7:
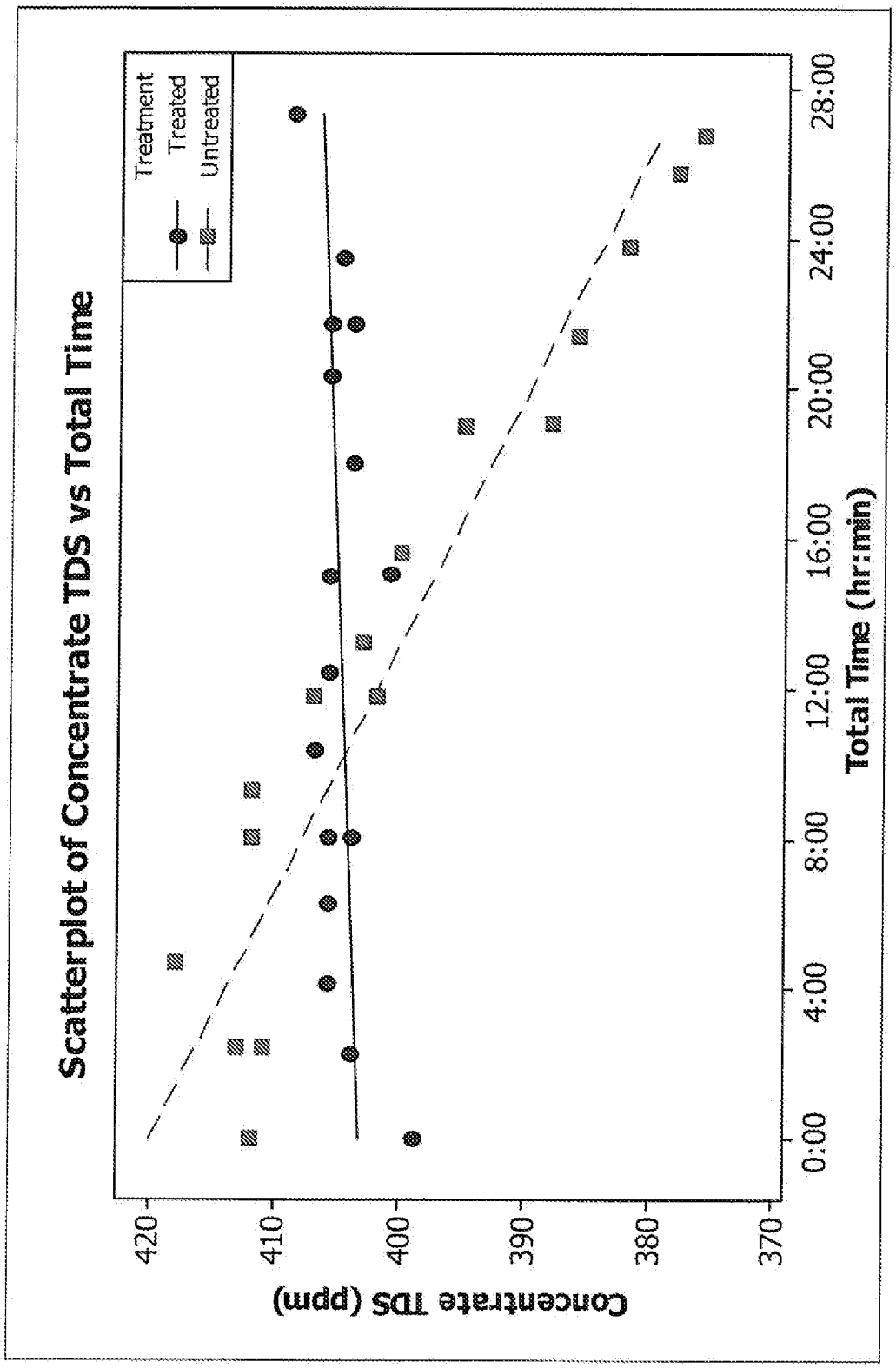
FIG. 7 is a graphical depiction of the total dissolved solids versus time as described in Example 6.
Figure 8:
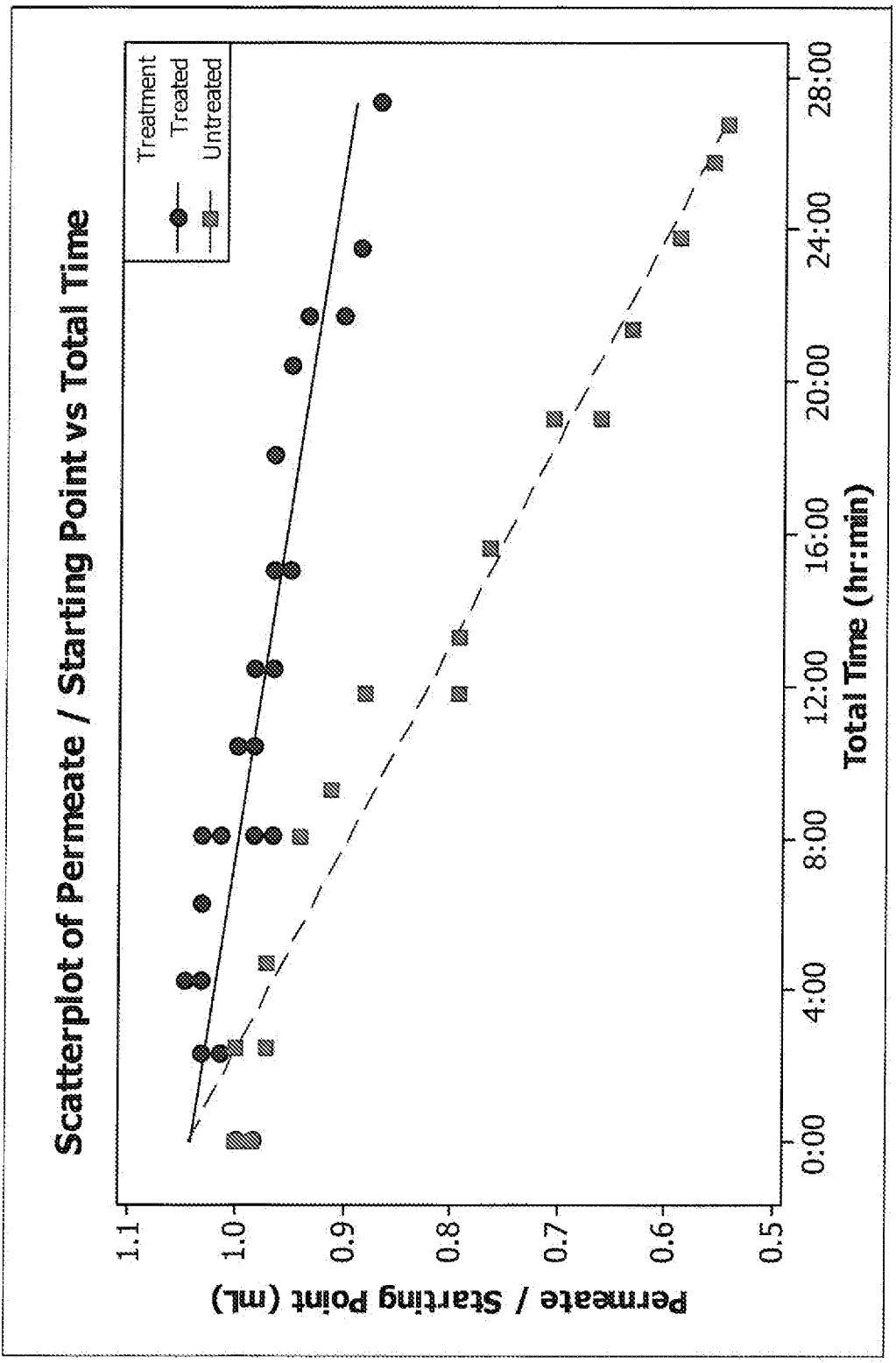
FIG. 8 is a graphical depiction of the permeate versus time as described in Example 6.

The results from this test are shown in FIG. 7 (Concentrate TDS vs. Total Time) and FIG. 8 (Scatterplot of Permeate vs. Total Time). The concentrate water by definition is the water and solids rejected by the membrane i.e. the material not passed through the membrane. As a membrane gets fouled or plugged, the TDS of the concentrate will decrease because the membrane is not passing as much water as before the membrane was fouled. As described below, at the same time that the TDS of the concentrate is decreasing, the permeate flow though the membrane will also decrease with fouling as explained below.

In this experiment, the fouling of the membrane exposed to the untreated water progressed to where it was severely plugged as indicated by the decrease in concentrate TDS. Fouling of a membrane from hard water scaling is a known problem when using a membrane in hard water. The chemical analysis of the membrane exposed to the untreated water confirmed that the untreated membrane was fouled with calcium carbonate scale.

As can be seen from FIG. 7, the amount of TDS in the concentrate water decreased over time with the untreated water, and remained relatively constant with the treated water. That is, the membrane exposed to the treated hard water showed no decrease in TDS throughout the 28 hour experiment, indicating that the treated water protected the membrane from scaling.

As can be seen from FIG. 8, the permeate flow rate declines at a faster rate using untreated water compared to the treated water. It is thought that this is due to calcium carbonate and other insoluble salts precipitating on the membrane more slowly when using the treated water compared to the untreated water. This water hardness scale precipitation builds up and gradually restricts the flow of water through the membrane (permeate flow). The buildup of scale on the membrane that had untreated water circulated through it was so severe in this test that the permeate flow was reduced to nearly one-half of the starting flow rate, as seen in FIG. 8.

Overall, it was found that using water treated with an apparatus according to embodiments of the present invention lead to a decrease in scaling when circulated through a reverse osmosis system.

Example 7

A test was run to evaluate the pH and total dissolved solids content of water when passed through an apparatus in accordance with embodiments of the present invention compared to traditional water treatment media. The following resins/media were tested: Resin A was a Lanxess S-8528 resin, commercially available from Lanxess, that had been exhausted by having previously been used for 5,000 cycles of 9 seconds on 27 seconds off with 17 gpg cold water at a flow rate of four gallons per minute; Media B was a slightly used Watts media, commercially available from Watts Water Technologies; and Media C was an unused Watts media, commercially available from Watts Water Technologies. A control was also run, without any resin or media for comparison.

17 gpg water was cycled through the test resins/media for ten seconds on, and two minutes off. The water was passed through the test resins/media at a rate of one gallon per minute during the on cycle. Samples were taken at the same time from each test resin/media, and immediately evaluated for pH and TDS. The results are shown in FIGS. 9 and 10.

Figure 9:
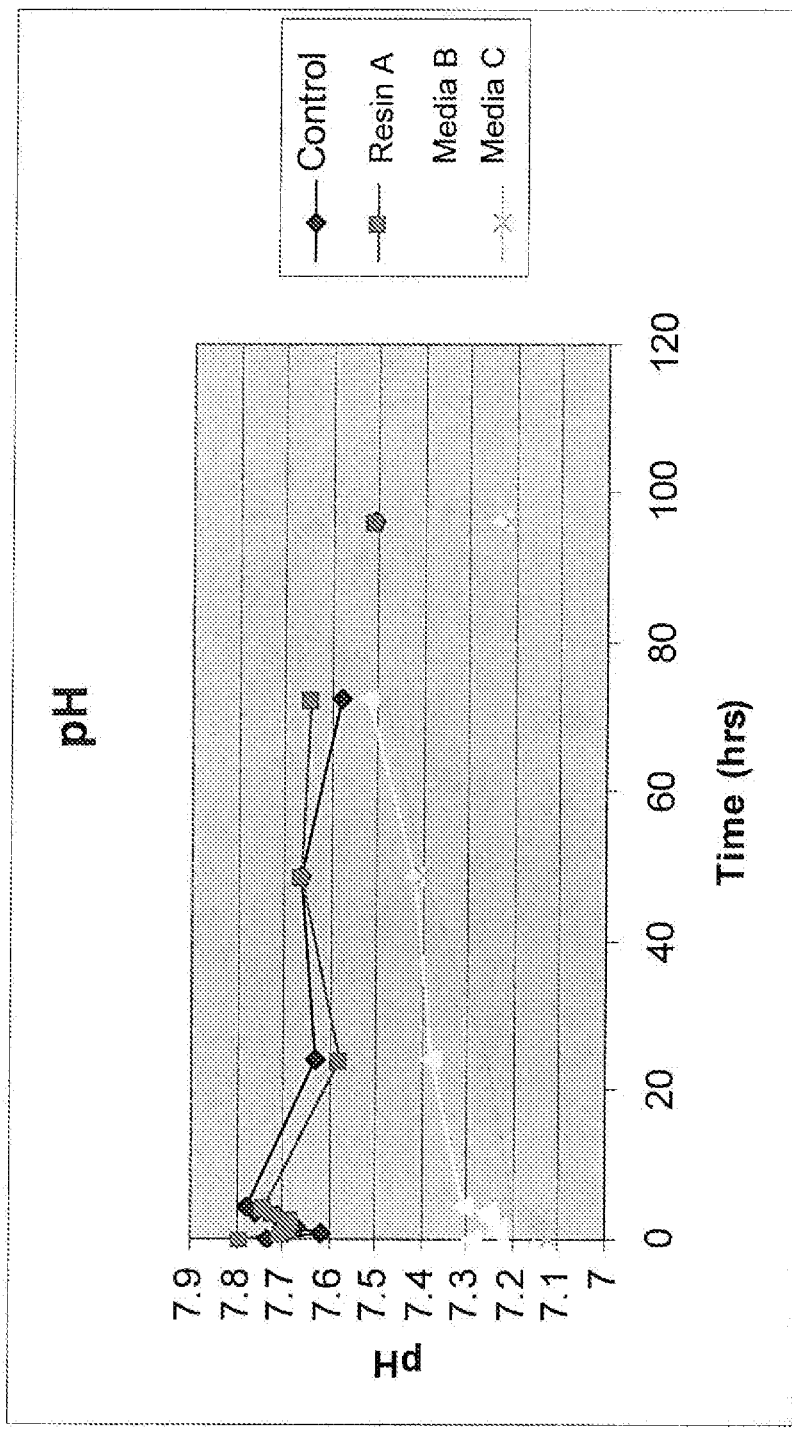
FIG. 9 is a graphical depiction of the change in pH over time as described in Example 7.
Figure 10:
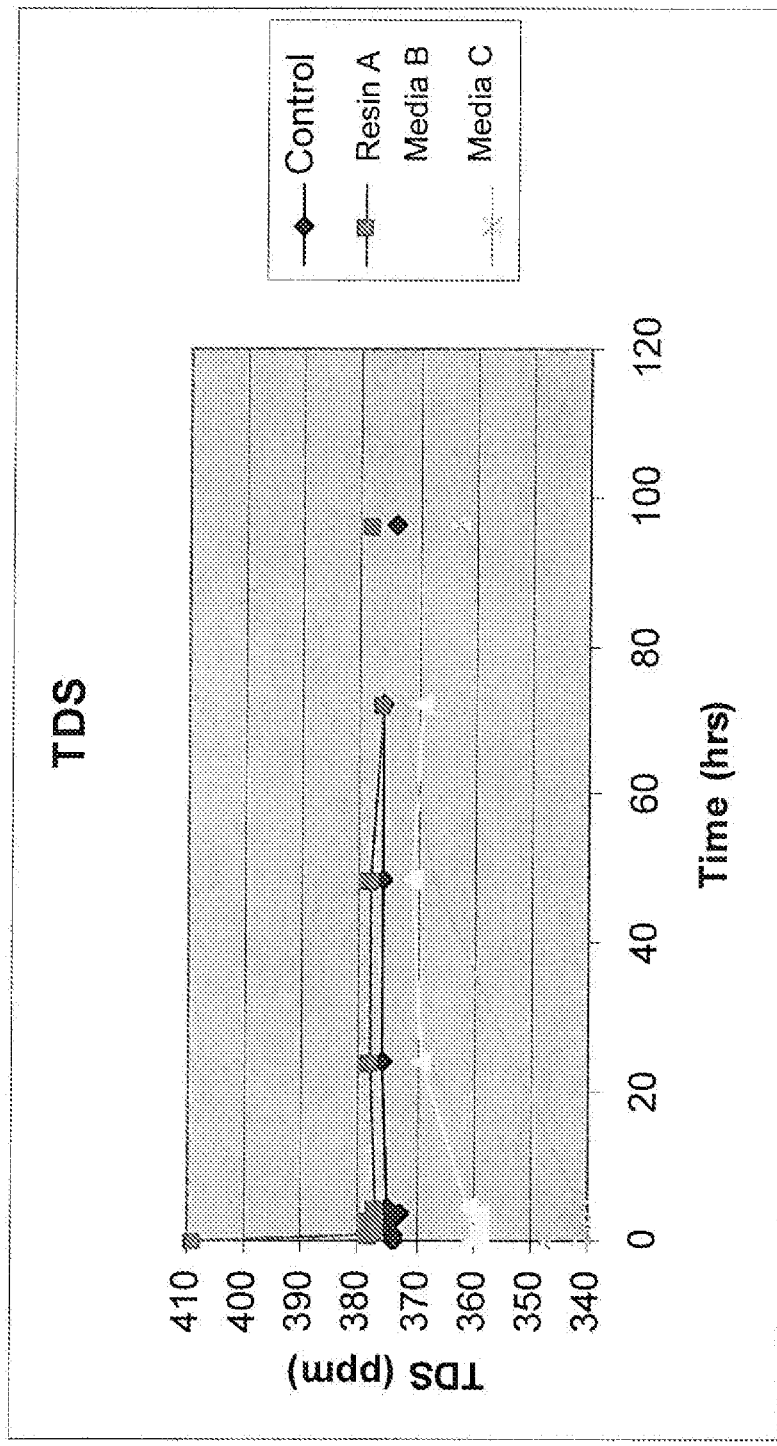
FIG. 10 is a graphical depiction of the amount of total dissolved solids in parts per million over time as described in Example 7.

As can be seen in FIG. 9, the pH of the water treated with Resin A remained relatively constant throughout treatment and closely matched that of the control. The pH of the water treated with Media B and C was significantly lower at first and then increased over time. Likewise, as shown in FIG. 10, the TDS of the water treated with Resin A remained relatively constant and equal to the control throughout treatment. The TDS of the water treated with Media B and C was significantly lower and generally increased over time with usage. Without wishing to be bound by any particular theory, it is thought that the gradual increase in TDS and pH for Media B and C over time is due to those media being used and gradually losing their efficacy over time with usage. When Media B and C are not used for a period of time, i.e. a resting period, the drop in pH and TDS returns as seen in the last data points in FIGS. 9 and 10.

It is also thought that the immediate drop in pH and TDS of water treated with Media B and C is the result of calcium carbonate precipitating out of the water as caused by this particular media. The water changes are chemically explained by the removal of calcium and carbonate ions from the water and the simultaneous addition of CO2 into the water. These side-effects of precipitation are documented in literature available from the manufacturer of the media.

Overall it was found that water treated with a resin in accordance with embodiments of the present invention, Resin A, the pH and the TDS of the water did not substantially deviate from the control. This indicates that resin A is not causing precipitation of hardness in the water.

Example 8

A test was run to evaluate the effect of adding an oxidant to a water treatment apparatus. For this test, chlorine was used as an oxidant, and was tested at two concentrations, 1 ppm and 10 ppm. The addition of the oxidant was also evaluated when added before or after the water was treated by the resin. The test also evaluated of the effects of the addition of a carbon filter before or after the resin. The resin tested was Lanxess Lewatit S-8528. The resin was pre-conditioned for 5500 cycles of 9 seconds on 27 seconds off with 17 gpg cold water at 4 gallons per minute Two tests were run, one to measure performance, and one to measure the total organic carbon (TOC) of the water. For the performance test, a door type dishmachine (Hobart AM-15) was used. The selected treatment apparatus was connected to the water inlet of the dishmachine so that all of the water for the machine was treated. The inlet water had a hardness of 17 grains. Glassware was placed inside the dishmachine in a glassware rack. The machine was run normally for 130 cycles. No chemicals, e.g., detergents, rinse aids, other than the water treatment apparatuses, and the addition of an oxidant, chlorine, were used in this test. After the 130 cycles were complete, the glassware was removed and allowed to air dry. Photos of the glasses were taken. A light box was also used to determine reflectance which is a direct correlation to the amount of scale present. That is, a lower score correlates to less scale present on the glasses.

Figure 11:
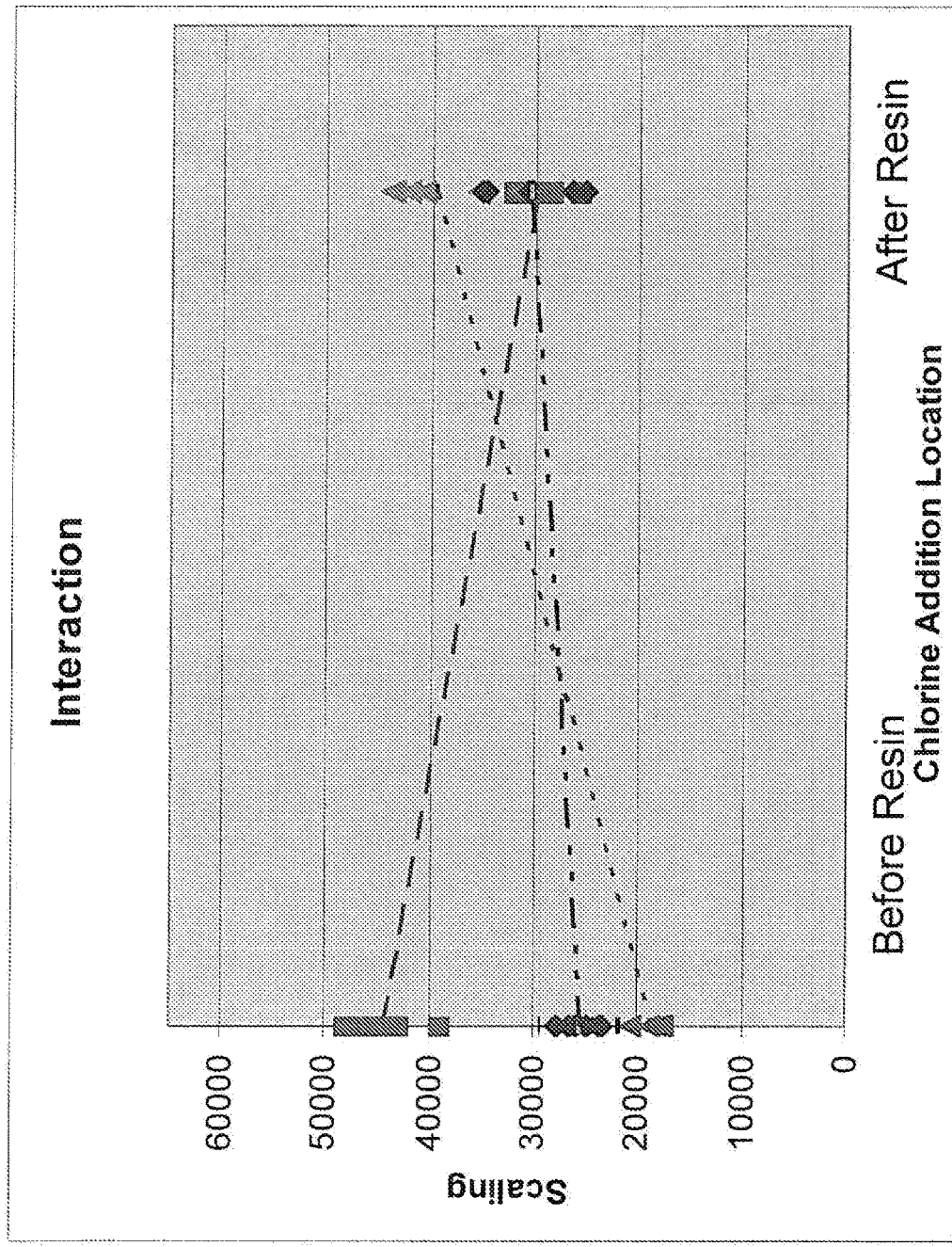
FIG. 11 is a graphical depiction of the amount of scaling measured on a light box as described in Example 8, with the addition of 1 part per million chlorine.
Figure 12:
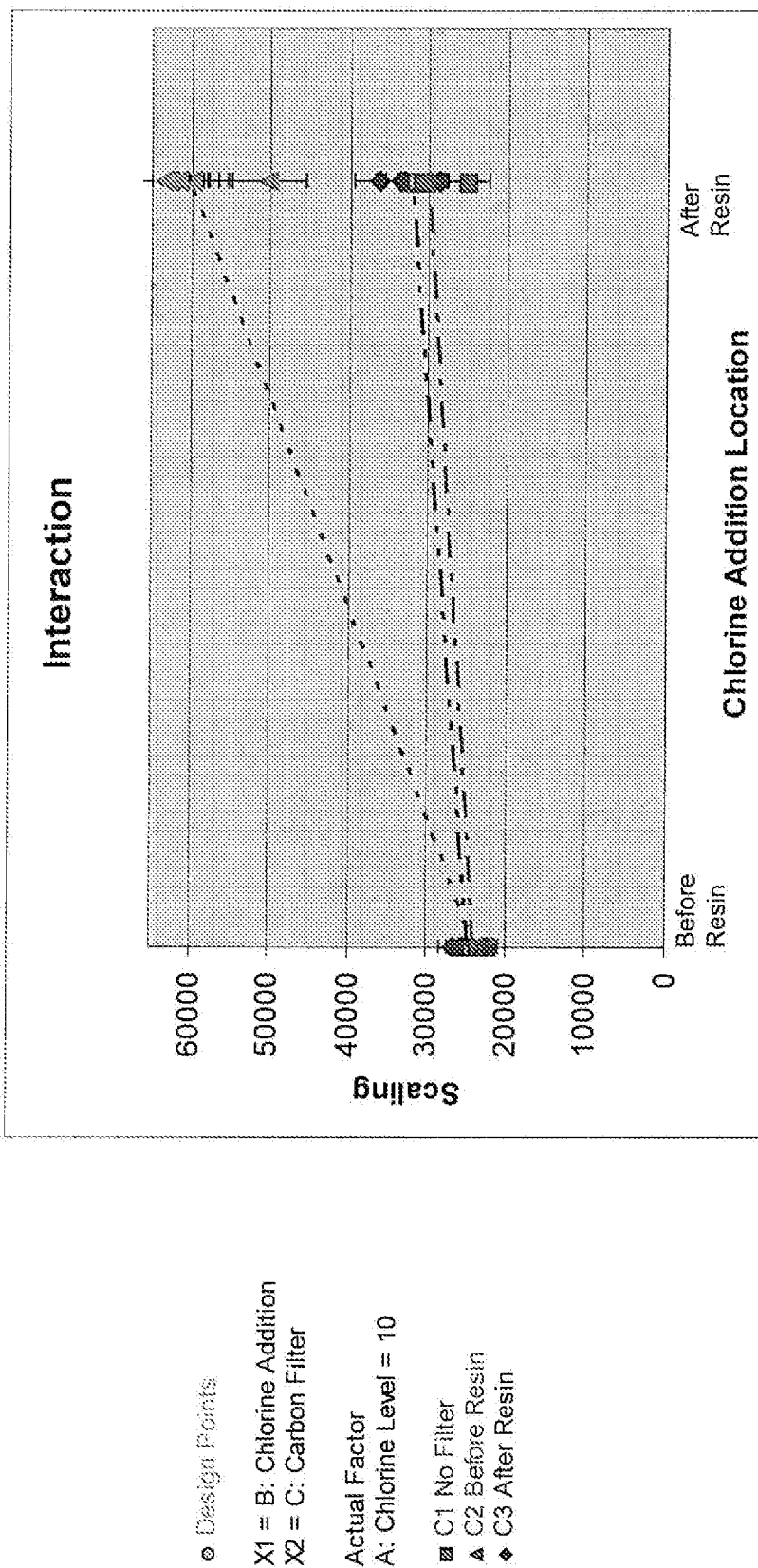
FIG. 12 is a graphical depiction of the amount of scaling measured on a light box as described in Example 8, with the addition of 10 parts per million chlorine.

The results of a test including 1 ppm of chlorine added either before or after the water passes through the treatment apparatus, and with or without the use of an additional carbon filter are shown in FIG. 11. FIG. 12 shows the results of a test including 10 ppm of chlorine added either before or after the water passes through the treatment apparatus, and with or without the use of an additional carbon filter.

As can be seen from these figures, an increase in the level of chlorine before the water treatment apparatus boosts the performance of the water treatment apparatus in a dish machine test. The effect was further pronounced at higher levels of chlorine (10 ppm).

Figure 13:
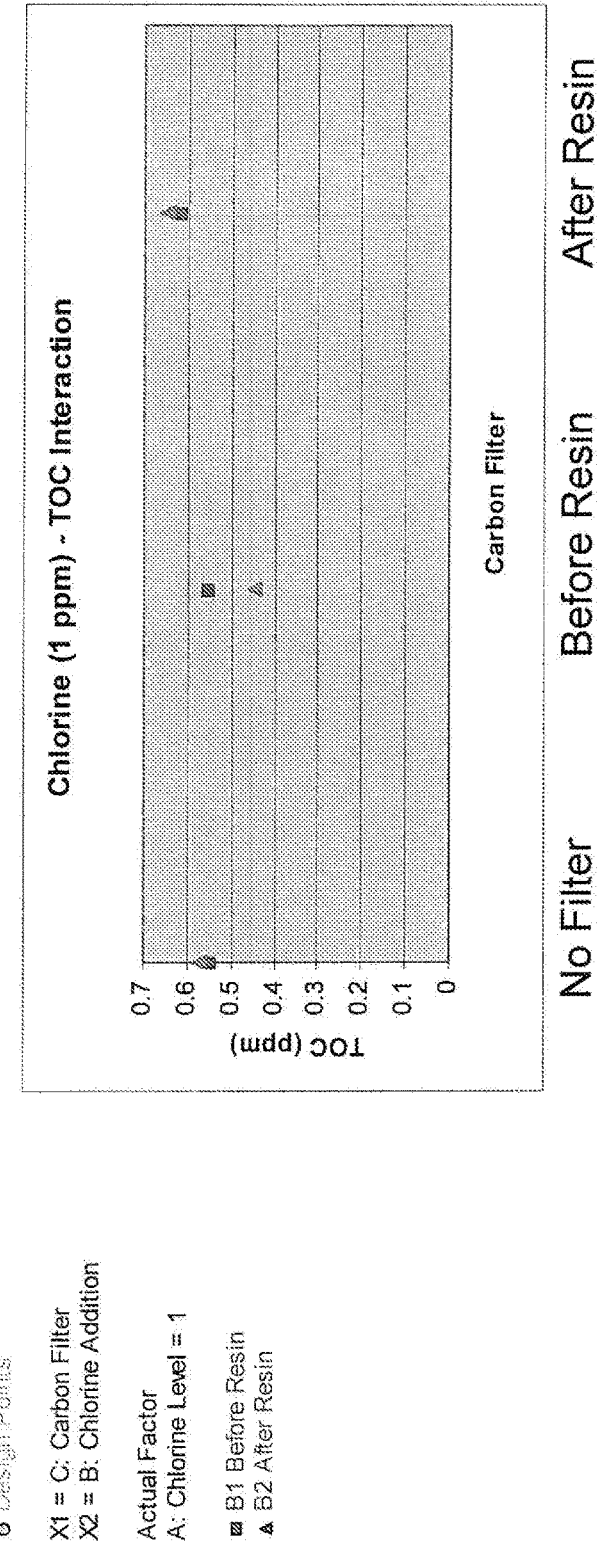
FIG. 13 is a graphical depiction of the total organic carbon measured with the addition of 1 part per million chlorine as described in Example 8.
Figure 14:
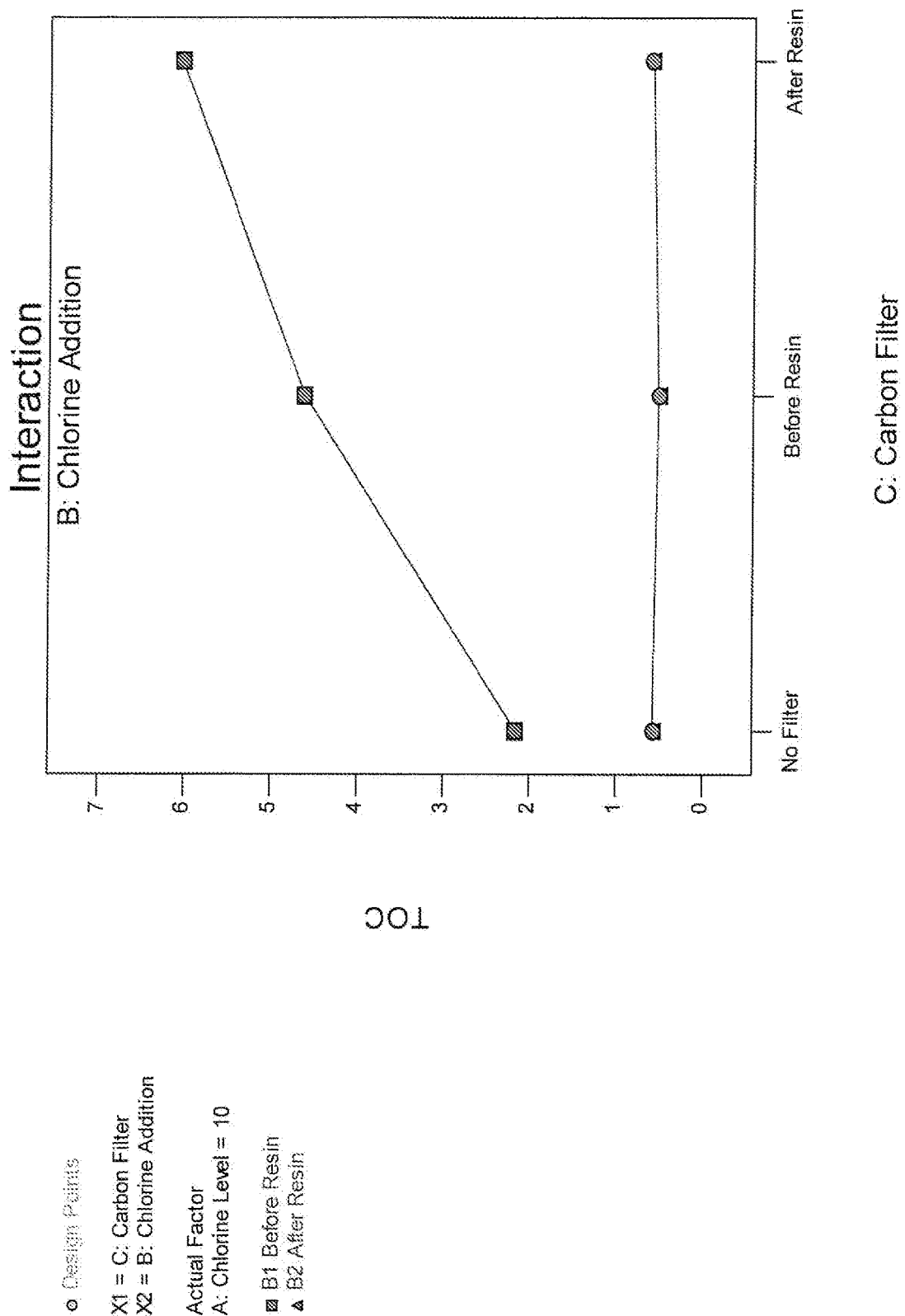
FIG. 14 is a graphical depiction of the total organic carbon measured with the addition of 10 parts per million chlorine as described in Example 8.

The ppm TOC of the sample was also measured with a GE Sievers 900 laboratory TOC analyzer. The results are shown in FIG. 13 (1 ppm chlorine added) and FIG. 14 (10 ppm chlorine added). As can be seen from these figures, the increase in chlorine level to 10 ppm before the resin also increases the TOC level regardless of carbon filter location. When chlorine is added before the resin, the chlorine will contact the resin and act as an oxidant to the resin. As can be seen in FIG. 14, 10 ppm of chlorine before the resin increased the TOC levels compared to adding 10 ppm chlorine after the resin.

Another test was run to evaluate the effects of different oxidants on the water treatment apparatus. For this test, the following resins were included in the water treatment apparatuses: Lanxess Lewatit S-8528, commercially available from Lanxess; IRC-76, commercially available from Dow; Purolite C107, commercially available from the Purolite Corporation; and Dow MAC-3, commercially available from Dow. The resins were pre-conditioned by running cold water for 2,400 cycles through the resins. Each cycle consisted of 9 seconds run time followed by 27 seconds off with 17 gpg cold water at 4 gallons per minute. For this shake up test, 5 grams of the wet resin was put into 40 grams of water solutions containing the selected oxidants, then shaken up by hand for 10 seconds, and then submerged in the same solutions overnight. The oxidants in this test included: 150 ppm ClO, and 150 ppm H2O2. The solutions were shaken again before filtration. The TOC of the filtered material was measured.

Figure 15:
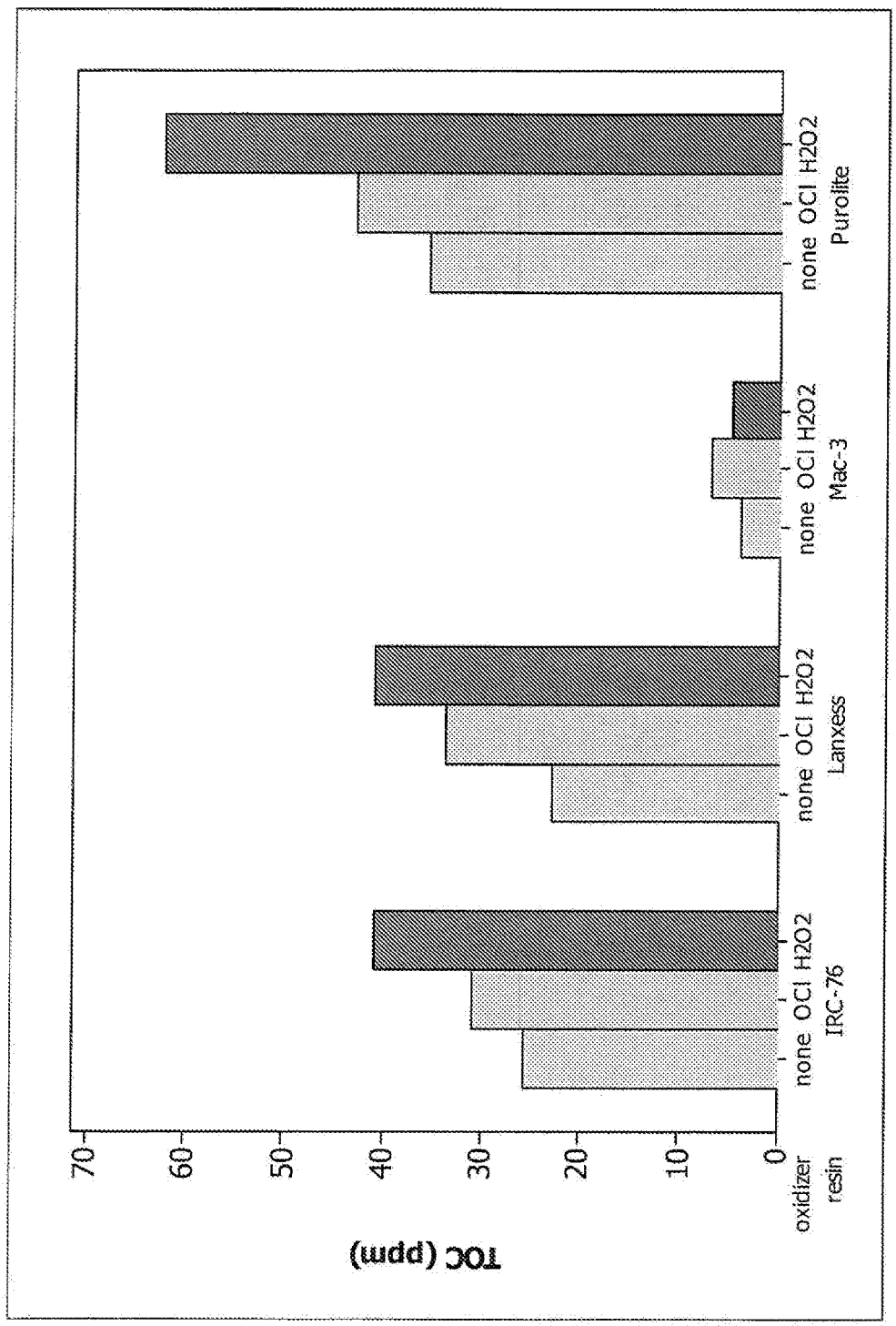
FIG. 15 is a graphical depiction of the total organic carbon measured in parts per million of various exhausted resin materials with the addition of different oxidants as described in Example 8.

The results of this test are shown in FIG. 15. As can be seen from FIG. 15, the addition of either oxidant boosted the level of TOC in each of the filtrates. Without wishing to be bound by any particular theory, it is believed that the Mac-3 resin has a much lower relative TOC because it is more a highly crosslinked resin. TOC levels are known in the art to be inversely related to crosslinking percentages.

Figure 16:
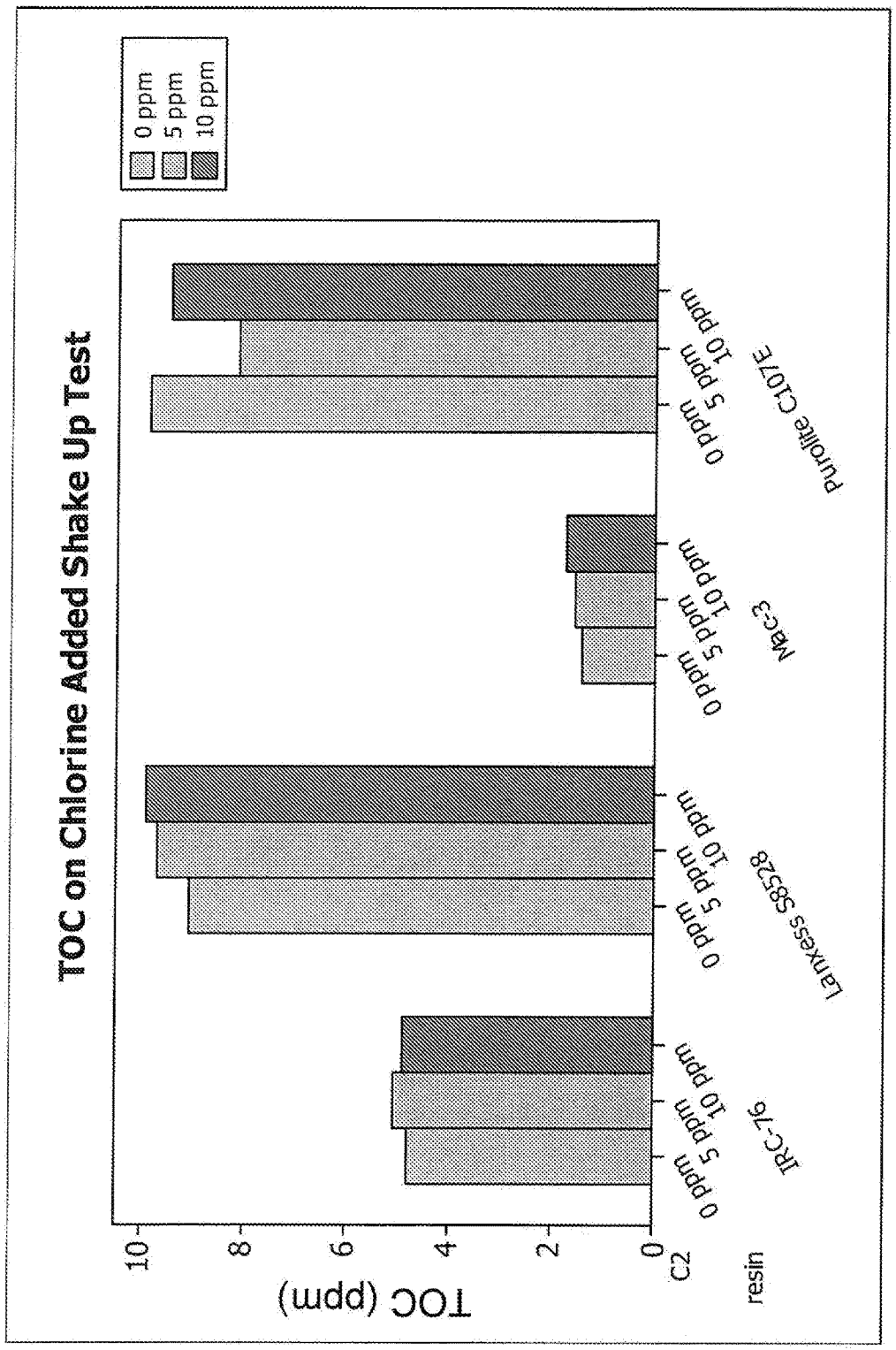
FIG. 16 is a graphical depiction of the total organic carbon measured in parts per million of various exhausted resin materials with the addition of varying levels of chlorine as described in Example 8.

Another test was run to further evaluate the effects of the addition of chlorine in a shake-up test. For this test, the following resins were included in the water treatment apparatuses: Lanxess Lewatit S-8528, commercially available from Lanxess; IRC-76, commercially available from Dow; Purolite C107, commercially available from the Purolite Corporation; and Dow MAC-3, commercially available from Dow. The resins were pre-conditioned by running cold water for 2,400 cycles through the resins. For this shake up test, 5 grams of the wet resin and 40 grams of water were shaken together on an automatic shaker for 10 minutes. Either 5 ppm, or 10 ppm of chlorine, or no chlorine (control) was added to the water. After the ten minutes, the water was filtered and the TOC was measured. The results from this test are shown in FIG. 16. As can be seen from this Figure, the addition of chlorine did boost the TOC levels for three out of the four resins tested. Without wishing to be bound by a particular theory, it is believed that the Mac-3 resin has a much lower TOC because it is a more highly crosslinked resin.

Example 9

A test was run to measure the limescale build up control on glasses using various water treatment apparatuses containing exhausted resin material. Each of the resins tested was previously exhausted by running 17 grain cold water for about 6,600 cycles on a laboratory test rig. Each conditioning cycle consisted of 9 seconds run time followed by 27 seconds off with 17 gpg cold water at 4 gallons per minute. The resins tested included the following: Lanxess Lewatit S-8528, commercially available from Lanxess; IRC-76, commercially available from Dow; Purolite C107, commercially available from the Purolite Corporation; Dow MAC-3, commercially available from Dow; and Watts OneFlow II, commercially available from Watts Water Technologies.

The test was run using a door type dishmachine (Hobart AM-15). The selected test apparatus was connected to the inlet water to the dishmachine so that all of the water for the machine was treated. The inlet water had a hardness of 17 grains. The test was run for 100 continuous cycles. Each cycle consisted of: 45 second wash at 160° F., 10 second wash at 186° F., and a 20 second dwell or rest between cycles. . . .

Glassware was placed inside the dishmachine in a glassware rack. The machine was run normally for 100 cycles. No chemicals, e.g., detergents, rinse aids, other than the treatment apparatuses were used in this test. After the 100 cycles were complete, the glassware was removed and allowed to air dry. Photos of the glasses were taken. A light box was also used to determine reflectance which is a direct correlation to the amount of scale present.

Figure 17:
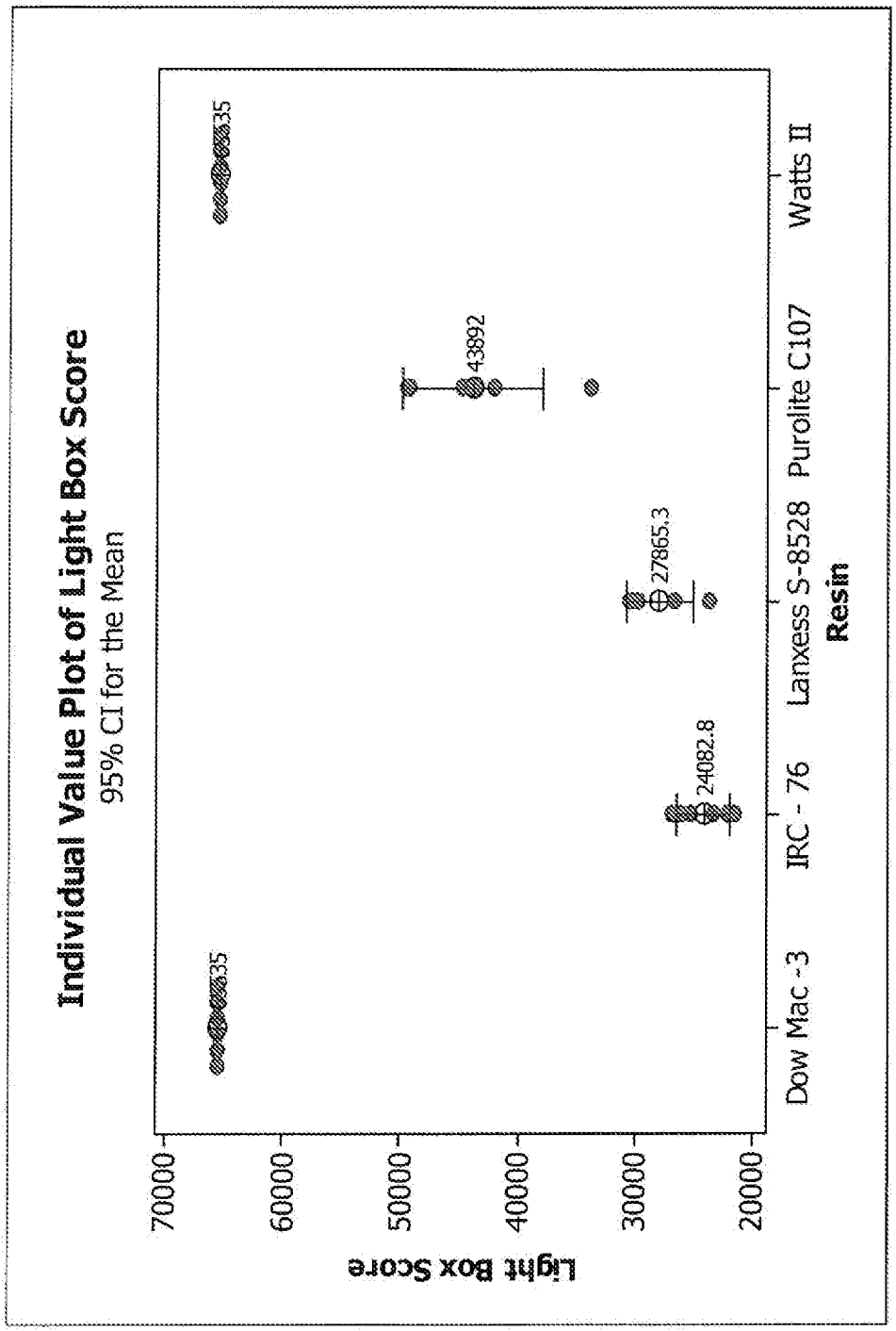
FIG. 17 is a graphical depiction of the light box score for glasses treated with water from various exhausted resins as described in Example 9.

The results are shown in FIG. 17. As can be seen from this figure, the exhausted IRC-76 and Lanxess materials performed the best in the dishmachine, i.e., had the least amount of scaling. The first four resins in FIG. 17 are each polyacrylate weak acid cation exchange resins pre-conditioned to exhaustion. As can be seen, the anti-scaling performance in this test varies widely from poor (Mac-3) to fair (C107) to good (IRC-76 and S-8528). Without wishing to be bound by any particular theory, it is thought that the chemical differences between these resins lead to the differences in performance. The resin crosslinking percentages is one such difference, as exemplified by the Mac-3 resin, which is assumed to have a relatively high level of crosslinking as indicated by its rather low TOC levels (FIGS. 15 and 16).

Example 10

Various resin samples were pre-conditioned by running cold, 17 gpg, water for 23,000 cycles through the resin, followed by 30,000 cycles of hot, 17 gpg, water. The resins tested included the following: Lanxess Lewatit S-8528, commercially available from Lanxess; IRC-76, commercially available from Dow; Purolite C107, commercially available from the Purolite Corporation; Dow MAC-3, commercially available from Dow; and Watts OneFlow II, commercially available from Watts Water Technologies. Each cycle consisted of 9 seconds of run time, followed by 27 seconds off. Thirty grams of wet resin were put into 25 g of ultrapure water, and shaken up overnight. The samples were then filtered and submitted for Gel Permeation Chromatography (GPC).

Figure 18A:
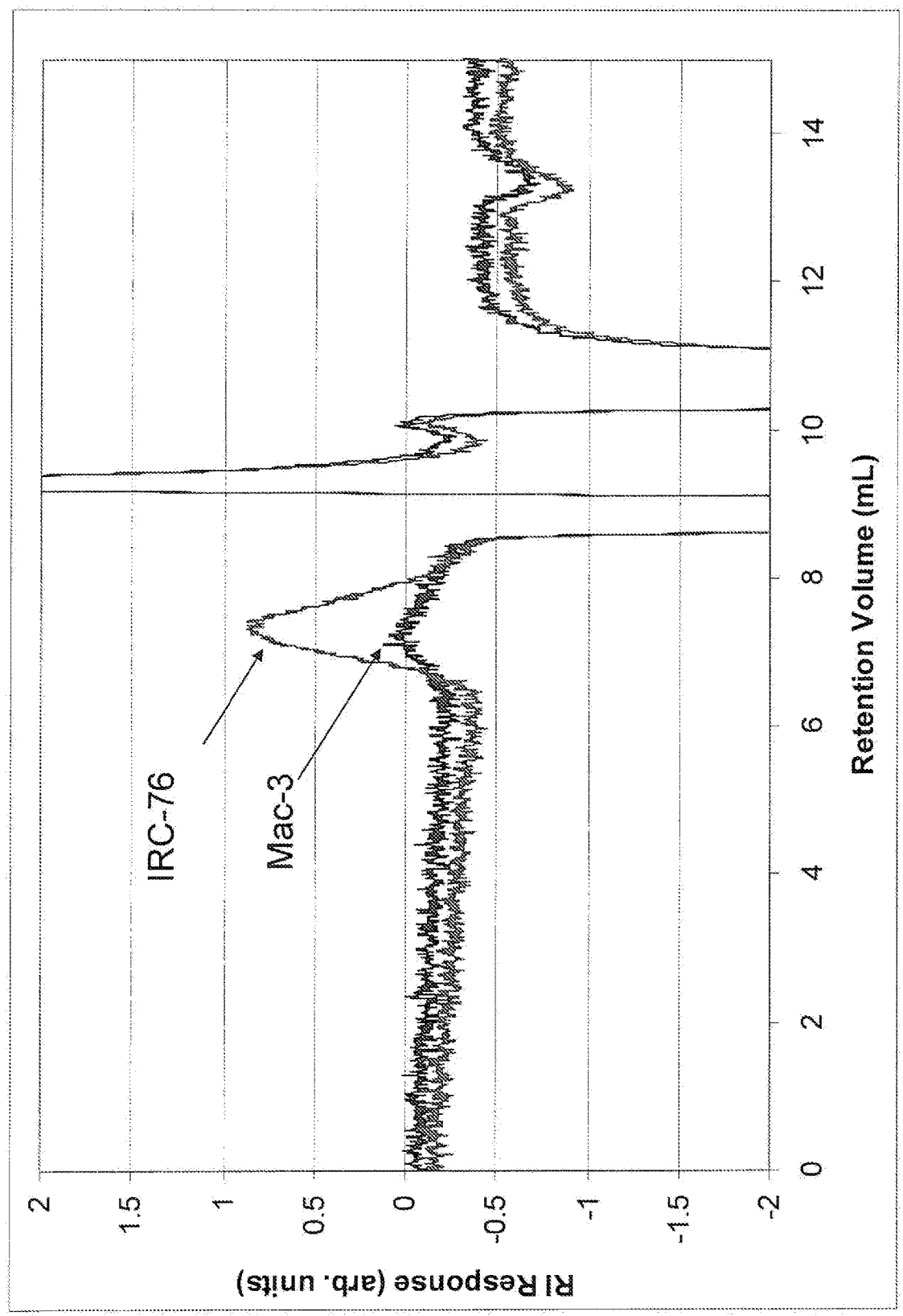
FIG. 18A is a graphical depiction of the Gel Permeation Chromatography study described in Example 10.

The samples were run on a Viscotek GPCmax equipped with a TriSEC detector array. Fifty microliters of each sample was injected into the aqueous GPC system using only refractive index detection to determine the apparent concentration. The results are shown in FIG. 18A. As can be seen in this Figure, the chromatograph shows a lower concentration of extractables than the IRC-76. The retention time on the chromatograph is consistent with a less than 10,000 molecular weight polyacrylate standard.

In this testing, assuming the detector response is similar for each polymer tested, the apparent concentration of the extracted substance from the Dow MAC-3 resin was measurably lower than any of the other tested resin extracts. These results are in agreement with the TOC analysis (discussed in Example 8), which showed Dow MAC-3 had the lowest carbon content when compared to all other tested resins. The GPC testing also shows that the carbon content is present as a low molecular weight polymer, as opposed to a low molecular weight hydrocarbon. FTIR analysis confirmed that the polymer is most likely a polyacrylate species.

Overall, this study, in combination with application testing, demonstrates that a minimum concentration of TOC/polymer is necessary for function. When the concentration of extractables is too low, as with the Dow MAC-3, shown by the TOC and GPC testing, the application testing results are also poor, as shown in Example 9.

Other Embodiments

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

What is claimed is:

1. A method for treating water comprising:
providing a water treatment apparatus comprising an inlet, an outlet, a first water treatment reservoir comprising a water treatment composition;
intaking the water source through the inlet;
contacting the water source with the water treatment composition to form a treated water source;
wherein the water treatment composition comprises a substantially water insoluble, weakly acidic cation resin material loaded with a plurality of one or more multivalent cations such that the resin material is exhausted; and wherein the resin material has a bed depth of less than about two feet; and discharging the treated water source through the outlet;
wherein the resin material includes an acrylic acid polymer crosslinked with divinyl benzene, wherein the acrylic acid polymer is less than 8% crosslinked, and wherein the resin material has a surface comprising functional groups comprising carboxyl groups, a particle size of from 0.5 mm to 1.6 mm, and a uniformity coefficient of 1.2 or less or 1.5 to 1.9; and
wherein the treated water source comprises greater than 4 ppm total organic carbon.

2. The method of claim 1, wherein the multivalent cations comprise a mixture of calcium and magnesium ions.

3. The method of claim 1, wherein the composition does not precipitate water hardness ions out of the source of water when contacted with the water source.

4. The method of claim 1, wherein the substantially insoluble resin material provides a polymer material to the water source, and wherein the polymer material is a polymer having a molecular weight of about 150 to about 100,000.

5. The method of claim 1, wherein the water treatment apparatus does not conduct significant ion exchange.

6. The method of claim 1, further comprising heating the water source prior to the step of contacting the composition; and/or agitating the composition during the contacting step.

7. The method of claim 1, wherein the composition is agitated by means comprising flowing water through the water treatment reservoir, fluidization, mechanical agitation, air sparge, eductor flow, baffles, flow obstructers, static mixers, high flow backwash, recirculation, or a combination thereof.

8. The method of claim 1, further comprising the step of increasing the pH of the water source prior to or during the step of contacting the composition.

9. The method of claim 1, wherein the treated water reduces scale formation on a surface contacted by the treated water source versus the water source.

10. The method of claim 1, wherein the resin material includes a gel type resin structure, a macroporous type resin structure, or a combination thereof.

11. The method of claim 1, wherein the water source is provided to the water treatment reservoir at a flow rate of about 50 feet per minute to about 200 feet per minute.

12. A method for reducing scale formation, comprising:
providing a water treatment apparatus comprising an inlet, an outlet, a first water treatment reservoir comprising a water treatment composition comprising a substantially water insoluble resin material;
intaking the water source through the inlet;
contacting the water source with the water treatment composition to form a treated water source,
wherein the substantially water insoluble resin material is loaded with a plurality of one or more multivalent cations such that the resin material is exhausted;
wherein the resin material has a bed depth of less than about two feet; and wherein the water treatment composition provides from about 10 to about 1000 parts per billion of the substantially water insoluble resin material to the treated water source;
contacting the treated water source with an article; and
discharging the treated water source through the outlet;
wherein the resin material includes an acrylic acid polymer crosslinked with divinyl benzene, wherein the acrylic acid polymer is less than 8% crosslinked, and wherein the resin material has a surface comprising functional groups comprising carboxyl groups, and a particle size of from 0.5 mm to 1.6 mm, and a uniformity coefficient of 1.2 or less or 1.5 to 1.9; and
wherein the treated water source comprises between greater than 4 ppm total organic carbon.

\* \* \* \* \*